(12) United States Patent
Contet et al.

(10) Patent No.: US 9,477,098 B2
(45) Date of Patent: Oct. 25, 2016

(54) OPHTHALMIC LENSES TAKING INTO ACCOUNT THE WEARER'S HANDEDNESS

(71) Applicant: ESSILOR INTERNATIONAL (COMPAGNIE GENERALE D'OPTIQUE), Chareton le Pont (FR)

(72) Inventors: Aude Contet, Charenton le Pont (FR); Cyril Guilloux, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/402,237

(22) PCT Filed: Jun. 28, 2013

(86) PCT No.: PCT/EP2013/063607
§ 371 (c)(1),
(2) Date: Nov. 19, 2014

(87) PCT Pub. No.: WO2014/001494
PCT Pub. Date: Jan. 3, 2014

(65) Prior Publication Data
US 2015/0146164 A1    May 28, 2015

(30) Foreign Application Priority Data

Jun. 29, 2012 (EP) .................................. 12305772
Feb. 20, 2013 (EP) .................................. 13305189

(51) Int. Cl.
*G02C 7/06* (2006.01)
*G02C 7/04* (2006.01)
*G02C 7/02* (2006.01)

(52) U.S. Cl.
CPC ............... *G02C 7/066* (2013.01); *G02C 7/021* (2013.01); *G02C 7/027* (2013.01); *G02C 7/028* (2013.01); *G02C 7/041* (2013.01); *G02C 7/06* (2013.01); *G02C 7/061* (2013.01); *G02C 7/063* (2013.01)

(58) Field of Classification Search
CPC ............. G02C 7/02–7/028; G02C 7/04–7/049
USPC ............. 351/159.01, 159.02, 159.73–159.77
See application file for complete search history.

(56) References Cited

U.S. PATENT DOCUMENTS

| 4,761,196 A | 8/1988 | Brown et al. |
| 5,444,501 A | 8/1995 | Aloi et al. |
| 5,666,184 A * | 9/1997 | Umeda ................... G02C 7/065 351/159.42 |
| 5,790,226 A | 8/1998 | Pollak |
| 2010/0097570 A1 | 4/2010 | Katzman et al. |
| 2011/0194070 A1 * | 8/2011 | Wietschorke .......... G02C 7/027 351/159.45 |

FOREIGN PATENT DOCUMENTS

| EP | 2 369 403 | 9/2011 |
| FR | 2 894 687 | 6/2007 |
| FR | 2 894 688 | 6/2007 |

OTHER PUBLICATIONS

R.C. Oldfield, "The Assessment and Analysis of Handedness: The Edinburgh Inventory", Neuropsychologia, 1971, vol. 9, pp. 97-113, Pergamon Press.

* cited by examiner

*Primary Examiner* — Darryl J Collins
(74) *Attorney, Agent, or Firm* — Cozen O'Connor

(57) ABSTRACT

Ophthalmic lenses and spectacles for enhanced experience due to right-handedness or left-handedness.

13 Claims, 19 Drawing Sheets

OPHTHALMIC LENSES TAKING INTO ACCOUNT THE WEARER'S HANDEDNESS

RELATED APPLICATIONS

This application is a U.S. National Phase application under 35 USC 371 of International Application PCT/EP2013/063607 filed Jun. 28, 2013.

This application claims the priority of European application Nos. 12305772.1 filed Jun. 29, 2012, and 13305189.6 filed Feb. 20, 2013, the entire content of both of which are hereby incorporated by reference.

FIELD OF THE INVENTION

The invention relates to ophthalmic lenses and spectacles for enhanced experience due to right-handedness or left-handedness.

BACKGROUND OF THE INVENTION

A wearer may be prescribed a positive or negative optical power correction. For presbyopic wearers, the value of the power correction is different for far-vision and near-vision, due to the difficulties of accommodation in near-vision. Ophthalmic lenses suitable for presbyopic wearers are multifocal lenses, the most suitable being progressive multifocal lenses.

The inventors have found that right-handed persons and left-handed persons behave quite differently when performing certain tasks, whether involving near-vision, intermediate-vision and/or far-vision. However, current lens designs do not include handedness as a design factor, whereas such factor impacts on wearer visual comfort.

SUMMARY OF THE INVENTION

One object of the present invention is to provide ophthalmic lenses, pair of lenses, ranges of lenses and eye glasses that are designed for enhanced handedness experience. The objects of the invention advantageously confer superior visual comfort to the wearer, and may be customized for improved comfort for near-vision and/or intermediate-vision and/or far-vision. Thus, improved comfort as a function of handedness may be further provided for specific wearer tasks and activities.

In one aspect, the present invention provides progressive multifocal ophthalmic lenses intended for a wearer, wherein the lens design features an asymmetry which is dependent on the wearer handedness. Such asymmetry may be introduced at the level of a single lens design (for example by introducing asymmetry between the nasal and temporal parts of the lens), and/or between each of the lenses within one pair (for example by introducing asymmetry in the left-eye design with respect to the right-eye design).

In another aspect, the present invention provides eyeglasses with frames that are designed as a function of handedness.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 19 shows eyeglasses of the invention, wherein the fitting is asymmetric as a function of the wearer's handedness.

FIG. 20 illustrates lenses of the invention that have asymmetric markings for locating a reference point;

FIG. 21 illustrates inset determination according to the invention;

FIG. 22 shows optical characteristics of lenses of the invention.

It can be appreciated that elements in the figures are illustrated for simplicity and clarity and have not necessarily been drawn to scale. For example, the dimensions of some of the elements in the figures may be exaggerated relatively to other elements to help improving the understanding of the embodiments of the present invention.

DEFINITIONS

The following definitions are provided to describe the present invention.

"Prescription data" are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV} CYL_{FV}/2$. Then, the mean refractive power for each eye for proximate (near) vision is obtained by summing the prescribed addition A to the far vision mean refractive power $P_{NV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A.

"Handedness" or "laterality" indicates the preference and/or the propensity of an individual to use one hand or the other. This is typically observed for a task such as writing, but is also reflected in other activities. A handedness parameter H can be used to describe the handedness of a subject.

"Ophthalmic lenses" are known in the art. According to the invention, the ophthalmic lens may be selected from progressive and regressive lenses; monofocal, bifocal, or more generally multifocal lenses. The lens may be for use in spectacles (eyeglasses), as contact lenses or as intraocular implants. The lens may also be a lens for information glasses, wherein the lens comprises means for displaying information in front of the eye. The lens may be a prescription or non-prescription lens. The lens may also be suitable for sunglasses or not. Preferred lenses according to the invention are progressive ophthalmic lenses, including progressive multifocal ophthalmic lenses. All ophthalmic lenses of the invention may be paired so as to form a pair of lenses (left eye LE, right eye RE).

A "pair of lenses" intended for a wearer designates a pair of lenses which are intended to be worn simultaneously by said wearer. Said pair is intended to be fitted into a frame.

Figure 1:
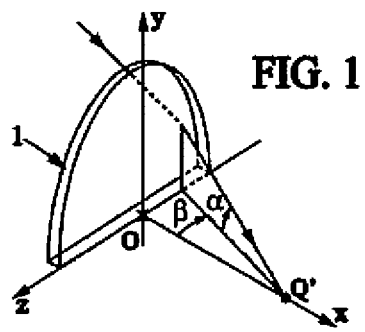
FIGS. 1 to 3 show, diagrammatically, optical systems of eye and lens and ray tracing from the center of rotation of the eye.
Figure 2:
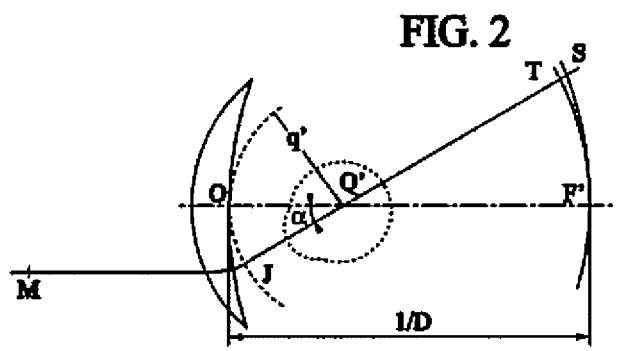

A "gaze direction" can be identified by a couple of angle values $(\alpha,\beta)$, wherein said angles values are measured with regard to reference axes centered on the center of rotation of the eye (CRE). More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze direction. This axis cuts the front surface of the lens on a point called the fitting cross, which is present on lenses to enable the positioning of lenses in a frame by an optician. The fitting cross corresponds to a lowering angle $\alpha$ of 0° and an azimuth angle $\beta$ of 0°. The point of intersection of the rear surface of the lens and the axis Q'F' is the point O. O can be the fitting cross if it is located on the rear surface. A vertex sphere, of center Q', and of radius q', which is intercepting the rear surface of the lens in a point of the horizontal axis. As examples, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J (see FIG. 2) of the vertex sphere; the angle $\beta$ is the angle formed between the axis Q'F' and the projection of the straight line Q'J on the horizontal plane comprising the axis Q'F'; this angle appears on the scheme on FIG. 1. The angle $\alpha$ is the angle formed between the axis Q'J and the projection of the straight line Q'J on the horizontal plane comprising the axis Q'F'; this angle appears on the scheme on FIGS. 1 and 2. A given gaze view thus corresponds to a point J of the vertex sphere or to a couple ($\alpha$, $\beta$). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

On the lens, for each gaze direction ($\alpha$, $\beta$), a refractive power $P_{\alpha,\beta}$, a module of astigmatism $Ast_{\alpha,\beta}$ and an axis $Axe_{\alpha,\beta}$ of this astigmatism, and a module of resulting (also called residual or unwanted) astigmatism $Asr_{\alpha,\beta}$ are defined.

"Ergorama" is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia. In the context of a unifocal lens, the ergorama may be defined as a plane situated at infinity distance. Using these elements, it is possible to define a wearer optical power and astigmatism, in each gaze direction. An object point M at an object distance given by the ergorama is considered for a gaze direction ($\alpha,\beta$). An object proximity ProxO is defined for the point M on the corresponding light ray in the object space as the inverse of the distance MJ between point M and point J of the vertex sphere:

$ProxO=1/MJ$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction ($\alpha,\beta$), the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

The optical power is also called refractive power

By analogy with the case of a thin lens, it can therefore be defined, for a given gaze direction and for a given object proximity, i.e. for a point of the object space on the corresponding light ray, an optical power Pui as the sum of the image proximity and the object proximity.

$Pui=ProxO+ProxI$

With the same notations, an astigmatism Ast is defined for every gaze direction and for a given object proximity as.

$$Ast = \left|\frac{1}{JT} - \frac{1}{JS}\right|$$

Figure 3:
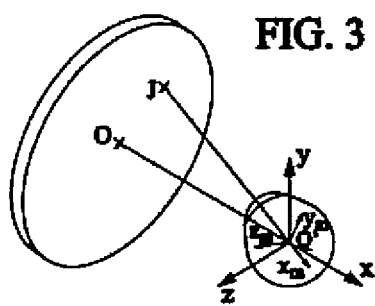

This definition corresponds to the astigmatism of a ray beam created by the lens. FIG. 3 represents a perspective view of a configuration wherein the parameters $\alpha$ and $\beta$ are non-zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is orientated from the lens towards the eye. The y axis is vertical and orientated upwardly. The z axis is such that the frame $\{x, y, z\}$ is orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 4 and 5.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle $\alpha$ of 0° and an azimuth angle $\beta$ of 0° whatever surface of the lens the fitting cross is positioned rear surface or front surface.

The above description made with reference to FIGS. 1-3 was given for central vision. In peripheral vision, as the gaze direction is fixed, the center of the pupil is considered instead of center of rotation of the eye and peripheral ray directions are considered instead of gaze directions. When peripheral vision is considered, angle $\alpha$ and angle $\beta$ correspond to ray directions instead of gaze directions.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle $\alpha<0°$ and the "lower" part of the lens corresponds to a positive lowering angle $\alpha>0°$. Similarly, the "upper" part of the surface of a lens or of a semi-finished lens blank—corresponds to a positive value along the y axis, and preferably to a value along the y axis superior to the y value corresponding to the fitting cross and the "lower" part of the surface of a lens or of a semi-finished lens blank—corresponds to a negative value along the y axis in the frame as defined above with respect to FIGS. 4 and 5, and preferably to a value along the y axis inferior to the y_value at the fitting cross.

The "meridian line" of a progressive lens may be defined as follows: for each lowering of the view of an angle $\alpha=\alpha_1$ between the gaze direction corresponding to the fitting cross and the bottom of the lens, the gaze direction ($\alpha_1$, $\beta_1$) is searched by ray tracing, in order to be able to see clearly the object point located in the median plane, at the distance determined by the ergorama. The median plane is the median plane of the head, preferentially passing through the base of the nose. This plane may also be passing through the middle of right and left eye rotation centers.

Thus, all the gaze directions defined in that way form the meridian line of the ergorama-eye-lens system. For personalization purpose, postural data of the wearer, such as angle and position of the head in the environment, might be taken into account to determine the object position. For instance, the object position might be positioned out of median plane to model a wearer lateral shift in near vision.

The meridian line of the lens represents the locus of mean gaze directions of a wearer when he is looking from far to near visions.

Figure 7:
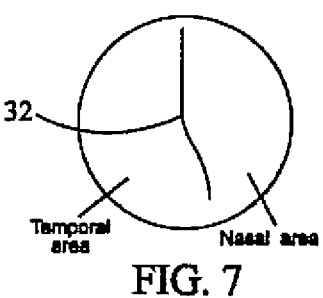

The "surface meridian line" 32 of the lens is defined as follow: each gaze direction ($\alpha$, $\beta$) belonging to the meridian line of the lens intersects the surface in a point (x, y). The surface meridian line is the set of points corresponding to the gaze directions of the meridian line of the lens. As shown in FIG. 7, the surface meridian line 32, belonging for example to the front surface of the lens, separates the lens in a nasal area (N) and a temporal area (T). As expected, the nasal area is the area of the lens which is between the meridian and the nose of the wearer whereas the temporal area is the area which is between the meridian and the temple of the wearer.

The "channel line" is defined for a progressive lens as the line containing the gaze directions that corresponds to the minimum of resulting astigmatism or the line located at almost equal distance from two gaze directions through the lens respectively on the nasal side and the temporal side, with same values for the lowering angle and also same values for the resulting astigmatism. Usually, lens manufacturers will match the meridian line of a progressive lens with approximately the channel line. Each meridian line or each channel line are contained in a vertical plane above the fitting cross, and deflected towards the nasal side below the fitting cross.

The "meridian line" and the "channel line" of a unifocal lens are defined as the vertical straight line passing through the optical center of the lens.

The "off-centered zone" of a lens is defined as the zone containing all the gaze directions comprised:
  inside a zone centered on to the gaze direction corresponding to gaze directions passing through the PRP and containing all gaze directions ($\alpha$, $\beta$) respecting the following inequality $(|\alpha|^2+|\beta|^2)^{1/2}\leq40°$, and
  outside a central optical zone; the central optical zone comprising a meridian line ($\alpha_1$, $\beta_1$), the central optical zone being delimited on either side of the meridian line by gaze directions whose azimuth angle is equal to $\beta_1\pm5°$.

The "nasal" and "temporal" sides of the lens are defined with respect to the meridian line. The nasal (resp. temporal) side corresponds to the set of gaze directions within the "off-centered zone" and limited to the side of the nose (resp. temple) with respect to the meridian line.

Figure 6:
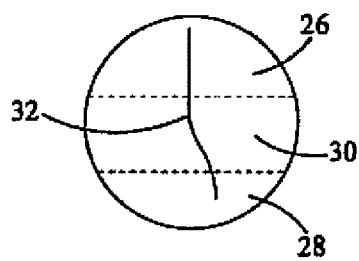
FIGS. 6 and 7 show field vision zones of a lens.

The "visual field zones" seen through a progressive lens are known to the skilled person and are schematically illustrated in FIGS. 6 and 7. The lens comprises a far vision (distant vision) zone 26 located in the upper part of the lens, a near vision zone 28 located in the lower part of the lens and an intermediate zone 30 situated between the far vision zone 26 and the near vision zone 28. The lens also has a surface meridian line 32 belonging for example to the front surface and passing through the three zones and defining a nasal side and a temporal side.

Figure 4:
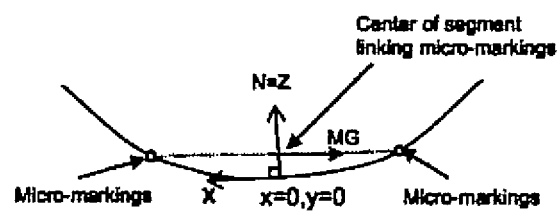
FIGS. 4 and 5 show referentials defined with respect to micro-markings, for a surface bearing micro-markings and for a surface not bearing the micro-markings respectively.
Figure 5:
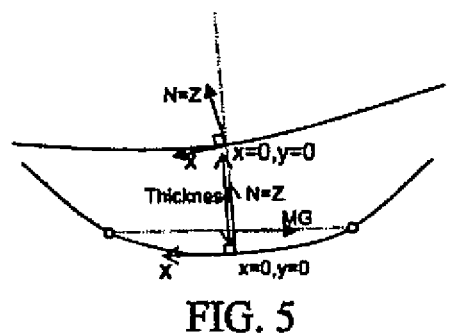

The "visual field zones" of a unifocal lens are defined as follows:

For a far-vision unifocal lens, namely a unifocal lens prescribed and mounted for far vision correction, the far-vision reference point corresponds to the optical center, the near-vision reference point corresponds to the point used for proximate vision, for example a point of coordinates NV (0, −15 mm), and the intermediate-vision reference point corresponds to the point used for intermediate vision, for example a point of coordinates IV (0, −7.5 mm), wherein the coordinates are relative to a Cartesian system of reference coordinates (OC, x,y) centered on the optical center OC of the lens localized on the front surface and of axes x and y belonging to the tangential plane to the front surface of the lens at OC, the x axis being parallel to the terrestrial plane when the lens is fitted into the frame and is worn by the wearer being in primary gaze situation (x axis is parallel to the axis formed by the micro-markings, if they are present; by analogy to a progressive lens, see FIG. 4), the y axis being perpendicular to the x axis;

For a near-vision unifocal lens, namely a unifocal lens prescribed and mounted for near vision correction, the near-vision reference point corresponds to the optical center, the intermediate-vision reference point may have coordinates of (0, +7.5 mm) and the far-vision reference point may have coordinates of (0, +15 mm) in the above defined Cartesian system;

The far-vision, near-vision and intermediate-vision zones of a unifocal lens are defined respectively as zones of the lens surrounding the far-vision, near-vision and intermediate vision reference points. Similar to FIG. 6, the limits of said zones may be defined at intermediary distance between the reference points.

A "proximate vision gaze direction" ($\alpha_{PV}$, $\beta_{PV}$) is defined for a lens, and may be also defined for each lens of a pair, that is to say a left proximate vision gaze direction ($\alpha_{PVL}$, $\beta_{PVL}$) for the left-eye lens of the pair and a right proximate vision gaze direction ($\alpha_{PVR}$, $\beta_{PVR}$) for the right-eye lens of the pair.

The proximate vision gaze direction belongs to the meridian line.

Generally, for a progressive lens, the proximate vision gaze direction, and thus $\alpha_{PV}$, is such that the corresponding refractive power is comprised between the prescribed far vision mean power $P_{FV}$ for this lens plus 50% of the addition A prescribed for this lens and the far vision mean power $P_{FV}$ prescribed for this lens plus 125% of the addition prescribed for this lens.

Advantageously, the proximate vision gaze direction, and thus $\alpha_{PV}$, is defined, for each lens of the pair, as the gaze direction where the refracting power reaches the far vision mean power $P_{FV}$ prescribed for this lens plus 85% of the addition A prescribed for this lens or as the gaze direction where the refracting power reaches the far vision mean power $P_{FV}$ prescribed for this lens plus 100% of the addition A prescribed for this lens A "near-vision temporal half-width of refractive power" $T_{P,\ nv}$ is defined for a progressive lens, as the angular distance, at constant lowering angle $\alpha$, between the proximate vision gaze direction ($\alpha_{PV}$, $\beta_{PV}$) and a gaze direction ($\alpha_{PV}$, $\beta_{TP,\ nv}$) on the temporal side of the lens where the refractive power $P_{\alpha PV,\beta TP,\ nv}$ reaches the value of the prescribed far vision mean power $P_{FV}$ for the lens plus three quarters of the prescribed addition A for the lens:

$$P_{\alpha PV,\beta TP,nv}=P_{FV}+\tfrac{3}{4}*A$$

A "near-vision nasal half-width of refractive power" $N_{P,\ nv}$ is defined for a progressive lens, as the angular distance, at constant lowering angle $\alpha$, between the proximate vision gaze direction ($\alpha_{PV}$, $\beta_{PV}$) and a gaze direction ($\alpha_{PV}$, $\beta_{NP}$) on the nasal side of the lens where the refractive power $P_{\alpha PV,\beta NP}$ reaches the value of the prescribed far vision mean power $P_{FV}$ for the lens plus three quarters of the prescribed addition A for the lens:

$$P_{\alpha PV,\beta NP,nv}=P_{FV}+\tfrac{3}{4}*A$$

A "near-vision temporal half-width of module of resulting astigmatism" $T_{A,\ nv}$ is defined for a progressive lens, as the angular distance, at constant lowering angle $\alpha$, between the proximate vision gaze direction ($\alpha_{PV}$, $\beta_{PV}$) and a gaze direction ($\alpha_{PV}$, $\beta_{TA,\ nv}$) on the temporal side of the lens where the module of resulting astigmatism $Asr_{\alpha PV,\beta TA,\ nv}$ reaches the value of one quarter of the prescribed addition A for the lens:

$$ASr_{\alpha PV,\beta TA,nv}=A/4$$

A "near-vision nasal half-width of module of resulting astigmatism" $N_{A,\ nv}$ is defined for a progressive lens, as the angular distance, at constant lowering angle $\alpha$, between the proximate vision gaze direction ($\alpha_{PV}$, $\beta_{PV}$) and a gaze direction ($\alpha_{PV}$, $\beta_{NA,\ nv}$) on the nasal side of the lens where the module of resulting astigmatism $ASr_{\alpha PV,\beta NA,\ nv}$ reaches the value of one quarter of the prescribed addition A for the lens:

$$Asr_{\alpha PV,\beta NA,nv}=A/4$$

A "near-vision temporal half-width of refractive power" $T_{P,\ nv}$ is defined for a near-vision unifocal lens, as the angular distance, at constant lowering angle $\alpha$, between the proximate vision gaze direction ($\alpha_{PV}$, $\beta_{PV}$) and a gaze direction ($\alpha_{PV}$, $\beta_{TP,\ nv}$) on the temporal side of the lens where the refractive power $P_{\alpha PV,\beta TP,\ nv}$ reaches 0.25 D.

A "near-vision nasal half-width of refractive power" $N_{P,\ nv}$ is defined for a near-vision unifocal lens, as the angular distance, at constant lowering angle $\alpha$, between the proximate vision gaze direction ($\alpha_{PV}$, $\beta_{PV}$) and a gaze direction ($\alpha_{PV}$, $\beta_{NP}$) on the nasal side of the lens where the refractive power $P_{\alpha PV,\beta NP}$ reaches 0.25 D.

A "near-vision temporal half-width of module of resulting astigmatism" $T_{A,\ nv}$ is defined for a near-vision unifocal lens, as the angular distance, at constant lowering angle $\alpha$, between the proximate vision gaze direction ($\alpha_{PV}$, $\beta_{PV}$) and a gaze direction ($\alpha_{PV}$, $\beta_{TA,\ nv}$) on the temporal side of the lens where the module of resulting astigmatism $Asr_{\alpha PV,\beta TA,\ nv}$ reaches 0.25 D.

A "near-vision nasal half-width of module of resulting astigmatism" $N_{A,\ nv}$ is defined for a near-vision unifocal lens, as the angular distance, at constant lowering angle $\alpha$, between the proximate vision gaze direction ($\alpha_{PV}$, $\beta_{PV}$) and a gaze direction ($\alpha_{PV}$, $\beta_{NA,\ nv}$) on the nasal side of the lens where the module of resulting astigmatism $ASr_{\alpha PV,\beta NA,\ nv}$ reaches 0.25 D.

A "far-vision gaze direction" is defined for a lens, as the vision gaze direction corresponding to the distant (far) reference point, and thus $\alpha_{FV}$, where the refractive power is substantially equal to the prescribed power in far vision. It may also be defined as the gaze direction corresponding to the fitting cross, in which case $\alpha=\beta=0°$. Within the present disclosure, far-vision is also referred to as distant-vision.

A "far-vision temporal half-width of refractive power" $T_{P,fv}$, is defined for a progressive lens, as the angular distance, at constant lowering angle $\alpha$, between the distant (far) vision gaze direction ($\alpha_{FV}$, $\beta_{FV}$) and a gaze direction ($\alpha_{FV}$, $\beta_{TP,fv}$) on the temporal side of the lens where the refractive power $P_{\alpha FV,\beta TP, fv}$ reaches the value of the prescribed far vision mean power $P_{FV}$ for the lens plus one quarter of the prescribed addition A for the lens:

$$P_{\alpha FV,\beta TP,fv}=P_{FV}+(\tfrac{1}{4})*A \qquad 5$$

A "far-vision nasal half-width of refractive power" $N_{P, fv}$ is defined for a progressive lens, as the angular distance, at constant lowering angle $\alpha$, between the proximate vision gaze direction $(\alpha_{FV}, \beta_{FV})$ and a gaze direction $(\alpha_{PV}, \beta_{NP, fv})$ on the nasal side of the lens where the refractive power $P_{\alpha FV,\beta NP, fv}$ reaches the value of the prescribed far vision mean power $P_{FV}$ for the lens plus one quarter of the prescribed addition A for the lens:

$$P_{\alpha FV,\beta NP,fv}=P_{FV}+(\tfrac{1}{4})*A \qquad 15$$

A "far-vision temporal half-width of module of resulting astigmatism" $T_{A, fv}$ is defined for a progressive lens, as the angular distance, at constant lowering angle $\alpha$, between the far vision gaze direction $(\alpha_{FV}, \beta_{FV})$ and a gaze direction $(\alpha_{FV}, \beta_{TA, fv})$ on the temporal side of the lens where the module of resulting astigmatism $ASr_{\alpha FV,\beta TA, fv}$ reaches the value of one quarter of the prescribed addition A for the lens:

$$ASr_{\alpha FV,\beta TA,fv}=A/4 \qquad 25$$

A "far-vision nasal half-width of module of resulting astigmatism" $N_{A, fv}$ is defined for a progressive lens, as the angular distance, at constant lowering angle $\alpha$, between the far vision gaze direction $(\alpha_{FV}, \beta_{FV})$ and a gaze direction $(\alpha_{FV}, \beta_{NA, fv})$ on the nasal side of the lens where the module of resulting astigmatism $ASr_{\alpha FV,\beta NA, fv}$ reaches the value of one quarter of the prescribed addition A for the lens:

$$ASr_{\alpha FV,\beta NA,fv}=A/4 \qquad 35$$

A "far-vision temporal half-width of refractive power" $T_{P, fv}$ is defined for a far-vision unifocal lens, as the angular distance, at constant lowering angle $\alpha$, between the distant (far) vision gaze direction $(\alpha_{FV}, \beta_{FV})$ and a gaze direction $(\alpha_{FV}, \beta_{TP, fv})$ on the temporal side of the lens where the refractive power $P_{\alpha FV,\beta TP, fv}$ reaches the value of 0.25 D.

A "far-vision nasal half-width of refractive power" $N_{P, fv}$ is defined for a far-vision unifocal lens, as the angular distance, at constant lowering angle $\alpha$, between the proximate vision gaze direction $(\alpha_{FV}, \beta_{FV})$ and a gaze direction $(\alpha_{FV}, \beta_{NP, fv})$ on the nasal side of the lens where the refractive power $P_{\alpha FV,\beta NP, fv}$ reaches the value of 0.25 D.

A "far-vision temporal half-width of module of resulting astigmatism" $T_{A, fv}$ is defined for a far-vision unifocal lens, as the angular distance, at constant lowering angle $\alpha$, between the far vision gaze direction $(\alpha_{FV}, \beta_{FV})$ and a gaze direction $(\alpha_{FV}, \beta_{TA, fv})$ on the temporal side of the lens where the module of resulting astigmatism $Asr_{\alpha FV,\beta TA, fv}$ reaches the value of 0.25 D.

A "far-vision nasal half-width of module of resulting astigmatism" $N_{A, fv}$ is defined for a far-vision unifocal lens, as the angular distance, at constant lowering angle $\alpha$, between the far vision gaze direction $(\alpha_{FV}, \beta_{FV})$ and a gaze direction $(\alpha_{FV}, \beta_{NA, fv})$ on the nasal side of the lens where the module of resulting astigmatism $Asr_{\alpha FV,\beta NA, fv}$ reaches the value of 0.25 D.

A "temporal half-width" and a "nasal half-width" may be defined by analogy for other optical parameters, such as the parameters listed below; and/or for other visions areas as listed below; and naturally for a lens intended for a left eye LE and/or a lens for a right eye RE;

"Useful zones of the lens" designate areas of the lens which are intended to be used by the wearer under certain circumstances. This includes useful areas in the parts of the lens for near-vision, distant-vision, and intermediate-vision; areas such as those for central vision, and peripheral vision; and combinations of the foregoing, e.g. central near vision, peripheral intermediate vision, etc. Useful zones may vary from one wearer to the other. Further, for a single wearer, useful zones may also vary when taking into account the general context in which the lenses are to be worn, and thus are activity dependent (lenses and hence eyeglasses for practicing sport, applying makeup, shaving, reading, using an e-tablet or a smartphone, writing at the desk, cooking, etc). The useful zone may also refer to the entirety of the lens. Useful zones may be determined by eye tracking, for example with tracking glasses.

"Optical parameters" are known in the art. According to the invention, an optical parameter ($\pi$) is a criterion that has an impact on visual performance.

Said optical parameter may be selected from:

any one of central vision optical criteria (CVOC) selected from the group comprising: power in central vision, astigmatism in central vision, high order aberration in central vision, acuity in central vision, prismatic deviation in central vision, ocular deviation, object visual field in central vision, image visual field in central vision, magnification in central vision, or a variation of preceding criteria;

any one of peripheral vision optical criteria (PVOC) selected from the group comprising: power in peripheral vision, astigmatism in peripheral vision, high order aberration in peripheral vision, pupil field ray deviation, object visual field in peripheral vision, image visual field in peripheral vision, prismatic deviation in peripheral vision, magnification in peripheral vision, or a variation of preceding criteria;

any one of global optical criteria (GOC) selected from the group comprising: magnification of the eye, temple shift, or a variation of preceding criteria;

any one of surface criteria (SC) selected from the group comprising: front or back mean curvature, front or back minimum curvature, front or back maximum curvature, front or back cylinder axis, front or back cylinder, front or back mean sphere, front or back maximum sphere, front or back minimum sphere or a variation of preceding criteria, the maximal value (respectively, minimal value, peak-to-valley value, maximal gradient value, minimal gradient value, maximal slope value, minimal slope value, average value) of any one of the preceding criteria, in one or more useful zones of the lens for near-vision, distant-vision, and intermediate-vision.

For example, said optical parameter may be the maximal value (respectively, minimal value, peak-to-valley value, maximal gradient value, minimal gradient value, maximal slope value, minimal slope value, average value) of any one of: resulting astigmatism, refractive power gradient, mean sphere gradient of the front surface, cylinder of the front surface, for one given gaze direction, over one zone of the lens, e.g. in one or more useful zones of the lens for central vision, peripheral vision, near-vision, distant-vision, and intermediate-vision, or combinations thereof, or where applicable, over the entire lens.

"Central vision" (also referred as "foveal vision") describes the work of the fovea, a small area in the center of the retina that contains a rich collection of cones. In a central vision situation, an observer looks at an object which stays in a gaze direction and the fovea of the observer is moved to follow the object. Central vision permits a person to read, drive, and perform other activities that require fine and sharp vision;

"Peripheral vision" describes the ability to see objects and movement outside of the direct line of vision. In a peripheral vision situation, an observer looks in a fixed gaze direction and an object is seen out of this direct line of vision. The direction of a ray coming from the object to the eye is then different from the gaze direction and is referred as peripheral ray direction. Peripheral vision is mainly the work of the rods, photoreceptor cells located outside the fovea of the retina;

A "peripheral ray direction" is defined by two angles measured with regard to reference axes centered on the eye entrance pupil and moving along the gaze direction axis;

"Power criterion in central vision" refers to refractive power generated by the lens when the wearer observes an object in central vision;

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis;

"Astigmatism criterion in central vision" refers to astigmatism criteria in central vision, selected from astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis;

"Higher-order aberrations in central vision" describe aberrations that modify the blurredness of the image of the object observed by the wearer in central vision besides the commonly residual power and residual astigmatism, for example, spherical aberration and coma. The orders by which aberrations are referred to are generally orders expressed by Zernike polynomial representation;

"Peripheral power" is defined as the power generated by the lens when the wearer observes an object in peripheral vision;

"Peripheral astigmatism" is defined as the astigmatism generated by the lens as regards amplitude, or both amplitude and the axis;

"Ocular deviation" is defined in central vision and describes the fact that adding a lens causes an eye to rotate in order to stay focused on the same object compared without lens. The angle can be measured in prismatic diopters or degree;

"Object visual field in central vision" is defined in the object space by the portion of space that the eye can observe scanning an angular portion of the lens determined by at least two gaze directions. For instance, these gaze directions can be defined by the shape of the spectacle frame or by an aberration level that hinders visualizing the object space with a good enough sharpness;

"Image visual field in central vision in the image space" is defined for a determined and fixed object visual field in central vision in the object space (eye space), as the angular portion scanned by the eye to visualize the visual field in the object space;

"Higher-order aberrations in peripheral vision" describe aberrations that modify the blurredness of the image of the object observed by the wearer in peripheral vision besides the commonly residual peripheral power and residual peripheral astigmatism, for example, peripheral spherical aberration and peripheral coma. The orders by which aberrations are referred to are generally orders expressed by Zernike polynomial representation;

"Pupil field ray deviation" describes that a ray coming from an object located in the peripheral field of view is modified by adding a lens on its path to the eye entrance pupil;

"Object visual field in peripheral vision" is defined in the object space. It is the portion of space that the eye can observe in the peripheral visual field of view (while the eye is looking in a fixed direction) defined by at least two rays issued from the center of eye entrance pupil. For instance, these rays can be defined by the shape of the spectacle frame or by an aberration level that hinders visualizing the object space with a good enough sharpness;

"Image visual field in peripheral vision" is defined for a determined and fixed peripheral object visual field as the corresponding angular portion in the image space viewed by the peripheral vision of the eye;

"Prismatic deviation in central vision" is defined in the object space by the angular deviation of a ray issued from the center of rotation of the eye introduced by the quantity of prism of the lens;

"Prismatic deviation in peripheral vision" is the angular deviation of a ray issued from the center of the entrance pupil introduced by the quantity of prism of the lens;

"Magnification in central/peripheral vision" is defined as the ratio between the apparent angular size (or the solid angle) of an object seen in central/peripheral vision without lens and the apparent angular size (or the solid angle) of an object seen through the lens in central/peripheral vision;

"Magnification of the eye" is defined as the magnification of the eye of the wearer assessed by an observer;

"temple shift" is defined as the offset of the wearer temple assessed by an observer;

A "minimum curvature" $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in $m^{-1}$.

A "maximum curvature" $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in $m^{-1}$.

"Minimum and maximum spheres" labeled $SPH_{min}$ and $SPH_{max}$ can be deduced according to the kind of surface considered.

When the surface considered is the object side surface (front surface), the expressions are the following:

$$SPH_{min} = (n-1)*CURV_{min} = \frac{n-1}{R_{max}} \text{ and}$$

$$SPH_{max} = (n-1)*CURV_{max} = \frac{n-1}{R_{min}}$$

where n is the refractive index of the constituent material of the lens.

If the surface considered is an eyeball side surface (rear surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the refractive index of the constituent material of the lens.

A "mean sphere" $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:
if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

A "cylinder axis" $\gamma_{AX}$ is the angle of the orientation of the maximum curvature $CURV_{max}$ with relation to a reference axis and in the chosen direction of rotation. In the TABO convention, the reference axis is horizontal (the angle of this reference axis is 0°) and the direction of rotation is counterclockwise for each eye, when looking to the wearer)($0°\leq\gamma_{AX}\leq180°$). An axis value for the cylinder axis $\gamma_{AX}$ of +45° therefore represents an axis oriented obliquely, which when looking to the wearer, extends from the quadrant located up on the right to the quadrant located down on the left.

The characteristics of any aspherical face of the lens may be expressed by means of the local mean spheres and cylinders.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

"micro-markings" have been made mandatory on progressive lenses by the harmonized standard ISO 8990-2. "Temporary markings" may also be applied on at least one of the two surfaces of the lens, indicating positions of control points (reference points) on the lens, such as a control point for far-vision, a control point for near-vision, a prism reference point and a fitting cross for instance. The prism reference point PRP is considered here at the midpoint of the straight segment which connects the micro-markings. If the temporary markings are absent or have been erased, it is always possible for a skilled person to position the control points on the lens by using a mounting chart and the permanent micro-markings. Similarly, on a semi-finished lens blank, standard ISO 10322-2 requires micro-markings to be applied. The centre of the aspherical surface of a semi-finished lens blank can therefore be determined as well as a referential as described above.

"inset" is known in the art and may be defined as follows. In a progressive addition lens, the near-vision point (the near-vision point corresponds to the intersection with the gaze direction allowing the wearer to gaze in near-vision, this gaze direction belonging to the meridian line) can be shifted horizontally with respect to a vertical line passing through the distance-vision point, when the lens is in a position of use by its wearer. This shift, which is in the direction of the nasal side of the lens, is referred to as "inset". It generally depends on a number of parameters, such as the optical power of the lens, the distance of observation of an object, the prismatic deviation of the lens and the eye-lens distance, notably. The inset may be an entry parameter selected by an optician at the time of lens order. Inset may be determined by computation or by ray tracing based upon the order data (prescription data).

"Ophthalmic lens material composition" refers to any composition suitable for making an ophthalmic lens. The skilled person is familiar with such compositions. Examples includes compositions of organic glass, such as of thermoplastic or thermoset materials, which may be selected from the group consisting of polycarbonates, polyurethanes, poly(thiourethanne), polyamides, polyimides, polysulfones, polycarbonate-ethylene terephthalate copolymers, polyolefines such as polynorbornenes, allyl diglycol carbonate homopolymers or copolymers, (meth) acrylic homopolymers and copolymers, thio(meth)acrylic homopolymers and copolymers, epoxy resins and episulfide resins.

DETAILED DESCRIPTION OF THE DRAWINGS

Ophthalmic Lenses

The present invention relates to an ophthalmic lens, intended to be worn by a wearer, wherein the lens is designed as a function of the wearer's handedness. The fact that the lens is designed as a function of the wearer's handedness indicates that at least one of the lens properties are selected taking into account the wearer's handedness. Such properties include lens size, lens surface parameters, lens optical parameters.

The lens is preferably a spectacle multifocal progressive ophthalmic lens, more preferably a multifocal progressive ophthalmic lens, but not limited thereto.

Lens with Asymmetry in Nasal/Temporal Half-Widths as a Function of Handedness

In one aspect, the ophthalmic lens of the invention is asymmetric in that the nasal/temporal half-widths of one or more of the following:
the near-vision zone with respect to a proximate-vision gaze direction, the intermediate-vision zone with respect to the meridian line, the distant-vision zone with respect to a distant-vision gaze direction, are asymmetric as a function of the wearer's handedness.

According to one aspect, the invention provides an ophthalmic lens intended for a wearer, wherein the near-vision nasal/temporal half-widths are asymmetric as a function of the wearer's handedness.

The half-widths may be defined for any optical parameter as described herein, in particular for the module of resulting astigmatism and/or for refractive power.

In one embodiment, for a left-handed wearer, the ratio of the difference over the sum of near-vision temporal and nasal half-widths of refractive power is set to a value less than or equal substantially to 0 $((T_{P,\,nv}-N_{P,\,nv})/(T_{P,\,nv}+N_{P,\,nv})\leq 0)$ and/or the ratio of the difference over the sum of near-vision temporal and nasal half-widths of module of resulting astigmatism is set to a value less than or equal substantially to 0 $((T_{A,\,nv}-N_{A,\,nv})/(T_{A,\,nv}+N_{A,\,nv})\leq 0)$; these ratios may each individually or both be set to a value strictly inferior than 0, for example <−0.10, <−0.15, <−0.20, <−0.25. The lens is preferably intended for the right eye of the wearer.

In another embodiment, for a left-handed wearer, the ratio of the difference over the sum of near-vision temporal and nasal half-widths of refractive power is set to a value greater than or equal substantially to 0 $((T_{P,\,nv}-N_{P,\,nv})/(T_{P,\,nv}+N_{P,\,nv})\geq 0)$ and/or the ratio of the difference over the sum of near-vision temporal and nasal half-widths of module of resulting astigmatism is set to a value greater than or equal substantially to 0 $((T_{A,\,nv}-N_{A,\,nv})/(T_{A,\,nv}+N_{A,\,nv})\geq 0)$; these ratios may each individually or both be set to a value strictly greater than 0, for example >0.10, >0.15, >0.20, >0.25. The lens is preferably for the left-eye of the wearer.

In another embodiment, for a left-handed wearer, the ratio of the difference over the sum of near-vision temporal and nasal half-widths of refractive power is set substantially to 0 $((T_{P,\,nv}-N_{P\_nv})/(T_{P,\,nv}+N_{P,\,nv})=0)$ and/or the ratio of the difference over the sum of near-vision temporal and nasal half-widths of module of resulting astigmatism is set substantially to 0 $((T_{A,\,nv}-N_{A,\,nv})/(T_{A,\,nv}+N_{A,\,nv})=0)$.

The above lenses may be paired so as to form a pair of lenses (RE/LE).

In one embodiment, for a right-handed wearer, the ratio of the difference over the sum of near-vision temporal and nasal half-widths of refractive power is set to a value greater than or equal substantially to 0 $((T_{P,\,nv}-N_{P,\,nv})/(T_{P,\,nv}+N_{P,\,nv})\geq 0)$ and/or the ratio of the difference over the sum of near-vision temporal and nasal half-widths of module of resulting astigmatism is set to a value greater than or equal substantially to 0 $((T_{A,\,nv}-N_{A,\,nv})/(T_{A,\,nv}+N_{A,\,nv})\geq 0)$; these ratios may each individually or both be set to a value strictly greater than 0, for example >0.10, >0.15, >0.20, >0.25. The lens is preferably intended for the right eye of the wearer.

In another embodiment, for a right-handed wearer, the ratio of the difference over the sum of near-vision temporal and nasal half-widths of refractive power is set to a value less than or equal substantially to 0 $((T_{P,\,nv}-N_{P,\,nv})/(T_{P,\,nv}+N_{P,\,nv})\leq 0)$ and/or the ratio of the difference over the sum of near-vision temporal and nasal half-widths of module of resulting astigmatism is set to a value less than or equal substantially to 0 $((T_{A,\,nv}-N_{A,\,nv})/(T_{A,\,nv}+N_{A,\,nv})\leq 0)$; these ratios may each individually or both be set to a value strictly inferior to 0, for example <−0.10, <−0.15, <−0.20, <−0.25. The lens is preferably for the left-eye of the wearer.

The above lenses may be paired so as to form a pair of lenses (RE/LE).

According to one aspect, the invention provides an ophthalmic lens intended for a wearer, wherein the far-vision nasal/temporal half-width are asymmetric as a function of the wearer's handedness. Advantageously, the fields are more open (half-widths larger) on the side of the writing hand.

In one embodiment, for a left-handed wearer, the ratio of the difference over the sum of far-vision temporal and nasal half-widths of refractive power is set to a value less than or equal substantially to 0 $((T_{P,\,fv}-N_{P,\,fv})/(T_{P,\,fv}+N_{P,\,fv})\leq 0)$ and/or the ratio of the difference over the sum of far-vision temporal and nasal half-widths of module of resulting astigmatism is set to a value less than or equal substantially to 0 $((T_{A,\,fv}-N_{A,\,fv})/(T_{A,\,fv}+N_{A,\,fv})\leq 0)$; these ratios may each individually or both be set to a value strictly inferior than 0, for example <−0.10, <−0.15, <−0.20, <−0.25. The lens is preferably intended for the right eye of the wearer.

In another embodiment, for a left-handed wearer, the ratio of the difference over the sum of far-vision temporal and nasal half-widths of refractive power is set to a value greater than or equal substantially to 0 $((T_{P,\,fv}-N_{P,\,fv})/(T_{P,\,fv}+N_{P,\,fv})\geq 0)$ and/or the ratio of the difference over the sum of far-vision temporal and nasal half-widths of module of resulting astigmatism is set to a value greater than or equal substantially to 0 $(T_{A,\,fv}-N_{A,\,fv})/(T_{A,\,fv}+N_{A,\,fv})\geq 0$; these ratios may individually each or both be set to a value strictly greater than 0, for example >0.10, >0.15, >0.20, >0.25. The lens is preferably for the left-eye of the wearer.

The above lenses may be paired so as to form a pair of lenses (RE/LE).

In one embodiment, for a right-handed wearer, the ratio of the difference over the sum of far-vision temporal and nasal half-widths of refractive power is set to a value greater than or equal substantially to 0 $((T_{P,\,fv}-N_{P,\,fv})/(T_{P,\,fv}+N_{P,\,fv})\geq 0)$ and/or the ratio of the difference over the sum of far-vision temporal and nasal half-widths of module of resulting astigmatism is set to a value greater than or equal substantially to 0 $((T_{A,\,fv}-N_{A,\,fv})/(T_{A,\,fv}+N_{A,\,fv})\geq 0)$; these ratios may each individually or both be set to a value strictly greater than 0, for example >0.10, >0.15, >0.20, >0.25. The lens is preferably intended for the right eye of the wearer.

In another embodiment, for a right-handed wearer, the ratio of the difference over the sum of far-vision temporal and nasal half-widths of refractive power is set to a value less than or equal substantially to 0 $((T_{P,\,fv}-N_{P,\,fv})/(T_{P,\,fv}+N_{P,\,fv})\leq 0)$ and/or the ratio of the difference over the sum of far-vision temporal and nasal half-widths of module of resulting astigmatism is set to a value less than or equal substantially to 0 $((T_{A,\,fv}-N_{A,\,fv})/(T_{A,\,fv}+N_{A,\,fv})\leq 0)$; these ratios may each individually or both be set to a value strictly inferior to 0, for example <−0.10, <−0.15, <−0.20, <−0.25. The lens is preferably for the left-eye of the wearer.

The above lenses may be paired so as to form a pair of lenses (RE/LE).

The above described asymmetries may be generalized to other optical parameters $\pi$, whether in the near-vision zone (NV), in the intermediate-vision zone (IV) or in the far-vision zone (FV).

According to one aspect, the invention provides an ophthalmic lens intended for a wearer, wherein the nasal/temporal half-widths are asymmetric as a function of the wearer's handedness. The asymmetry may apply to resulting astigmatism and/or power, whether in the far vision zone or in the near vision zone, and all combinations thereof.

The handedness is advantageously taken into account by means of a handedness value H. H depends solely on the wearer's handedness and may be determined as explained thereafter. In particular, H may be determined as illustrated in example 4.

On one embodiment,
for the right eye: $(T_{P, nv}-N_{P\_nv})/(T_{P, nv}+N_{P, nv})=0.002*H$, and/or
for the left eye: $(T_{P, nv}-N_{P, nv})/(T_{P, nv}+N_{P, nv})=-0.002*H$.
In another embodiment,
for the right eye: $(T_{A, nv}-N_{A, nv})/(T_{A, nv}+N_{A, nv})=0.002*H$, and/or
for the left eye: $(T_{A, nv}-N_{A, nv})/(T_{A, nv}+N_{A, nv})=-0.002*H$.
In another embodiment,
for the right eye: $(T_{P, fv}-N_{P, fv})/(T_{P, fv}+N_{P, fv})=0.002*H$, and/or
for the left eye: $(T_{P, fv}-N_{P, fv})/(T_{P, fv}+N_{P, fv})=-0.002*H$.
In another embodiment,
for the right eye: $(T_{A, fv}-N_{A, fv})/(T_{A, fv}+N_{A, fv})=0.002*H$, and/or
for the left eye: $(T_{A, fv}-N_{A, fv})/(T_{A, fv}+N_{A, fv})=-0.002*H$.

The above lenses may be paired so as to form a pair of lenses (RE/LE).

As stated, the features may also be combined, for example:
In one embodiment, for the right eye:
$(T_{P, nv}-N_{P\_nv})/(T_{P, nv}+N_{P, nv})=0.002*H$ and
$(T_{A, nv}-N_{A, nv})/(T_{A, nv}+N_{A, nv})=0.002*H$.
In another embodiment, for the left eye:
$(T_{P, nv}-N_{P, nv})/(T_{P, nv}+N_{P, nv})=-0.002*H$ and
$(T_{A, nv}-N_{A, nv})/(T_{A, nv}+N_{A, nv})=-0.002*H$.

In all the above embodiments, H may be determined as described thereafter, notably as in example 4, and thus H may have a value between −100 and +100.

Further, for one lens, any one of the above embodiments regarding half-widths in near vision may be combined with any one of the above embodiments regarding half-widths in far vision.

Pair of Lenses with Asymmetry in Nasal/Temporal Half-Widths as a Function of Handedness According to one aspect, the invention provides a pair of lenses intended for a wearer, wherein the nasal/temporal half-widths of the near-vision zone with respect to a proximate-vision gaze direction are asymmetric as a function of the wearer's handedness.

In one embodiment, for a left-handed wearer, the ratio of the difference over the sum of near-vision temporal and nasal half-widths of refractive power is set substantially to 0 for each lens of the pair $((T_{P\_LE, nv}-N_{P\_LE, nv})/(T_{P\_LE, nv}+N_{P\_LE, nv})=(T_{P\_RE, nv}-N_{P\_RE, nv})/(T_{P\_RE, nv}+N_{P\_RE, nv})=0)$ and/or the ratio of the difference over the sum of near-vision temporal and nasal half-widths of module of resulting astigmatism is set substantially to 0 for each lens of the pair $((T_{A\_LE, nv}-N_{A\_LE, nv})/(T_{A\_LE, nv}+N_{A\_LE, nv}) (T_{A\_RE, nv}-N_{A\_RE, nv})/(T_{A\_RE, nv}+N_{A\_RE, nv})=0)$.

In another embodiment, for a left-banded wearer, the ratio of the difference over the sum of near-vision temporal and nasal half-widths of refractive power is set to a value less than or equal substantially to 0 for the right-eye lens $((T_{P\_RE, nv}-N_{P\_RE, nv})/(T_{P\_RE, nv}+N_{P\_RE, nv})\leq 0)$ and/or the ratio of the difference over the sum of near-vision temporal and nasal half-widths of module of resulting astigmatism is set to a value less than or equal substantially to 0 for the right-eye lens $((T_{A\_RE, nv}-N_{A\_RE, nv})/(T_{A\_RE, nv}+N_{A\_RE, nv})\leq 0)$, and the ratio of the difference over the sum of near-vision temporal and nasal half-widths of refractive power is set to a value greater than or eqiml substantially to 0 for the left-eye lens $((T_{P\_LE, nv}-N_{P\_LE, nv})/(T_{P\_LE, nv}+N_{P\_LE, nv})\geq 0)$ and/or the ratio of the difference over the sum of near-vision temporal and nasal half-widths of module of resulting astigmatism is set to a value greater than or equal substantially to 0 for the left-eye lens $((T_{A\_LE, nv}-N_{A\_LE, nv})/(T_{A\_LE, nv}+N_{A\_LE, nv})\geq 0)$.

In another embodiment, for a left-handed wearer, $[(T_{P\_LE, nv}-N_{P\_LE, nv})/(T_{P\_LE, nv}+N_{P\_LE, nv})\geq 0$ and $(T_{P\_RE, nv}-N_{P\_RE, nv})/(T_{P\_RE, nv}+N_{P\_RE, nv})\leq 0]$ and/or $[(T_{A\_LE, nv}-N_{A\_LE, nv})/(T_{A\_LE, nv}+N_{A\_LE, nv})\geq 0$ and $(T_{A\_RE, nv}-N_{A\_RE, nv})/(T_{A\_RE, nv}+N_{A\_RE, nv})\leq 0]$.

In one embodiment, for a left-handed wearer, $[(T_{P\_LE, nv}-N_{P\_LE, nv})/(T_{P\_LE, nv}+N_{P\_LE, nv}) >0$ and $(T_{P\_RE, nv}-N_{P\_RE, nv})/(T_{P\_RE, nv}+N_{P\_RE, nv})<0]$ and/or $[(T_{A\_LE, nv}-N_{A\_LE, nv})/(T_{A\_LE, nv}+N_{A\_LE, nv})>0$ and $(T_{A\_RE, nv}-N_{A\_RE, nv})/(T_{A\_RE, nv}+N_{A\_RE, nv})<0]$.

In one embodiment, for a left-banded wearer, $[(T_{P\_LE, nv}-N_{P\_LE, nv})/(T_{P\_LE, nv}+N_{P\_LE, nv}) >0.15$, preferably $>0.20$, preferably $>0.25$, preferably $>0.30$ and $(T_{P\_RE, nv}-N_{P\_RE, nv})/(T_{P\_RE, nv}+N_{P\_RE, nv})<-0.15$, preferably $<-0.20$, preferably $<-0.25$, preferably $<0.30]$ and/or $[(T_{A\_LE, nv}-N_{A\_LE, nv})/(T_{A\_LE, nv}+N_{A\_LE, nv}) >0.15$, preferably $>0.20$, preferably $>0.25$, preferably $>0.30$ and $(T_{A\_RE, nv}-N_{A\_RE, nv})/(T_{A\_RE, nv}+N_{A\_RE, nv})<-0.15$, preferably $<-0.20$, preferably $<-0.25$, preferably $<-0.30]$.

In another embodiment, for a right-handed wearer, the ratio of the difference over the sum of near-vision temporal and nasal half-width of refractive power is set to a value greater than or equal substantially to 0 for the right-eye lens $((T_{P\_RE, nv}-N_{P\_RE, nv})/(T_{P\_RE, nv}+N_{P\_RE, nv}) \geq 0)$ and/or the ratio of the difference over the sum of near-vision temporal and nasal half-width of module of resulting astigmatism is set to a value greater than or equal substantially to 0 for the right-eye lens $((T_{A\_RE, nv}-N_{A\_RE, nv})/(T_{A\_RE, nv}+N_{A\_RE, nv}) \geq 0)$, and the ratio of the difference over the sum of near-vision temporal and nasal half-width of refractive power is set to a value less than or equal substantially to 0 for the left-eye lens $((T_{P\_LE, nv}-N_{P\_LE, nv})/(T_{P\_LE, nv}+N_{P\_LE, nv})\leq 0)$ and/or the ratio of the difference over the sum of near-vision temporal and nasal half-width of module of resulting astigmatism is set to a value less than or equal substantially to 0 for the left-eye lens $((T_{A\_LE, nv}-N_{A\_LE, nv})/(T_{A\_LE, nv}+N_{A\_LE, nv})\leq 0)$.

In another embodiment, for a right-handed wearer, the ratio of the difference over the sum of near-vision temporal and nasal half-width of refractive power in the near vision zone is set to a value strictly greater than 0 for the right-eye lens $((T_{P\_RE, nv}-N_{P\_RE, nv})/(T_{P\_RE, nv}+N_{P\_RE, nv}) >0)$ and/or the ratio of the difference over the sum of near-vision temporal and nasal half-width of module of resulting astigmatism is set to a value strictly greater than 0 for the right-eye lens $((T_{A\_RE, nv}-N_{A\_RE, nv})/(T_{A\_RE, nv}+N_{A\_RE, nv}) >0)$, and the ratio of the difference over the sum of near-vision temporal and nasal half-width of refractive power is set to a value strictly less than 0 for the left-eye lens $((F_{P\_LE, nv}-N_{P\_LE, nv})/(T_{P\_LE, nv}+N_{P\_LE, nv})<0)$ and/or the ratio of the difference over the sum of near-vision temporal and nasal half-width of module of resulting astigmatism is set to a value strictly less than 0 for the left-eye lens $((T_{A\_LE, nv}-N_{A\_LE, nv})/(T_{A\_LE, nv}+N_{A\_LE, nv}) <0)$.

In another embodiment, for a right-handed wearer, $[(T_{P\_LE, nv}-N_{P\_LE, nv})/(T_{P\_LE, nv}+N_{P\_LE, nv})\leq 0$ and $(T_{P\_RE, nv}-N_{P\_RE, nv})/(T_{P\_RE, nv}+N_{P\_RE, nv})\geq 0]$ and/or $[(T_{A\_LE, nv}-N_{A\_LE, nv})/(T_{A\_LE, nv}+N_{A\_LE, nv})\leq 0$ and $(T_{A\_RE, nv}-N_{A\_RE, nv})/(T_{A\_RE, nv}+N_{A\_RE, nv})\geq 0]$.

In another embodiment, for a right-handed wearer, $[(T_{P\_LE, nv}-N_{P\_LE, nv})/(T_{P\_LE, nv}+N_{P\_LE, nv})<0$ and $(T_{P\_RE,\ nv} - N_{P\_RE,\ nv})/(T_{P\_RE,\ nv} + N_{P\_RE,\ nv}) > 0]$ and/or
$[(T_{A\_LE,\ nv} - N_{A\_LE,\ nv})/(T_{A\_LE,\ nv} + N_{A\_LE,\ nv}) < 0$ and
$(T_{A\_RE,\ nv} - N_{A\_RE,\ nv})/(T_{A\_RE,\ nv} + N_{A\_RE,\ nv}) > 0]$.

In another embodiment, for a right-handed wearer, $[(T_{P\_LE,\ nv} - N_{P\_LE,\ nv})/(T_{P\_LE,\ nv} + N_{P\_LE,\ nv}) < -0.15$, preferably $<-0.20$, preferably $<-0.25$, preferably $<-0.30$ and $(T_{P\_RE,\ nv} - N_{P\_RE,\ nv})/(T_{P\_RE,\ nv} + N_{P\_RE,\ nv}) > 0.15$, preferably $>0.20$, preferably $>0.25$, preferably $>0.30]$ and/or $[(T_{A\_LE,\ nv} - N_{A\_LE,\ nv})/(T_{A\_LE,\ nv} + N_{A\_LE,\ nv}) < -0.15$, preferably $<-0.20$, preferably $<-0.25$, preferably $<-0.30$ and $(T_{A\_RE,\ nv} - N_{A\_RE,\ nv})/(T_{A\_RE,\ nv} + N_{A\_RE,\ nv}) > 0.15$, preferably $>0.20$, preferably $>0.25$, preferably $>0.30]$.

According to another aspect, the invention provides a pair of lenses intended for a wearer, wherein the nasal/temporal half-widths of the far-vision zone with respect to a far-vision gaze direction are asymmetric as a function of the wearer's handedness. Advantageously, the fields are more open (half-widths larger) on the side of the writing hand.

In one embodiment, for a right-handed wearer, $[(T_{P\_LE,\ fv} - N_{P\_LE,\ fv})/(T_{P\_LE,\ fv} + N_{P\_LE,\ fv}) \le 0$ and $(T_{P\_RE,\ fv} - N_{P\_RE,\ fv})/(T_{P\_RE,\ fv} + N_{P\_RE,\ fv}) \ge 0]$ and/or $[(T_{A\_LE,\ fv} - N_{A\_LE,\ fv})/(T_{A\_LE,\ fv} + N_{A\_LE,\ fv}) \le 0$ and $(T_{A\_RE,\ fv} - N_{A\_RE,\ fv})/(T_{A\_RE,\ fv} + N_{A\_RE,\ fv}) \ge 0]$.

In one embodiment, for a right-handed wearer, $[(T_{P\_LE,\ fv} - N_{P\_LE,\ fv})/(T_{P\_LE,\ fv} + N_{P\_LE,\ fv}) < 0$ and $(T_{P\_RE,\ fv} - N_{P\_RE,\ fv})/(T_{P\_RE,\ fv} + N_{P\_RE,\ fv}) > 0]$ and/or $[(T_{A\_LE,\ fv} - N_{A\_LE,\ fv})/(T_{A\_LE,\ fv} + N_{A\_LE,\ fv}) < 0$ and $(T_{A\_RE,\ fv} - N_{A\_RE,\ fv})/(T_{A\_RE,\ fv} + N_{A\_RE,\ fv}) > 0]$.

In another embodiment, for a right-handed wearer, $[(T_{P\_LE,fv} - N_{P\_LE,fv})/(T_{P\_LE,fv} + N_{P\_LE,fv}) < -0.15$, preferably $<-0.20$, preferably $<-0.25$, preferably $<-0.30$ and $(T_{P\_RE,fv} - N_{P\_RE,fv})/(T_{P\_RE,fv} + N_{P\_RE,fv}) > 0.15$, preferably $>0.20$, preferably $>0.25$, preferably $>0.30]$ and/or $[(T_{A\_LE,fv} - N_{A\_LE,fv})/(T_{A\_LE,fv} + N_{A\_LE,fv}) < -0.15$, preferably $<-0.20$, preferably $<-0.25$, preferably $<-0.30$ and $(T_{A\_RE,fv} - N_{A\_RE,fv})/(T_{A\_RE,fv} + N_{A\_RE,fv}) > 0.15$, preferably $>0.20$, preferably $>0.25$, preferably $>0.30]$.

In one embodiment, for a left-handed wearer, $[(T_{P\_LE,\ fv} - N_{P\_LE,\ fv})/(T_{P\_LE,\ fv} + N_{P\_LE,\ fv}) \ge 0$ and $(T_{P\_RE,\ fv} - N_{P\_RE,\ fv})/(T_{P\_RE,\ fv} + N_{P\_RE,\ fv}) \le 0]$ and/or $[(T_{A\_LE,\ fv} - N_{A\_LE,\ fv})/(T_{A\_LE,\ fv} + N_{A\_LE,\ fv}) \ge 0$ and $(T_{A\_RE,\ fv} - N_{A\_RE,\ fv})/(T_{A\_RE,\ fv} + N_{A\_RE,\ fv}) \le 0]$.

In one embodiment, for a left-handed wearer, $[(T_{P\_LE,\ fv} - N_{P\_LE,\ fv})/(T_{P\_LE,\ fv} + N_{P\_LE,\ fv}) > 0$ and $(T_{P\_RE,\ fv} - N_{P\_RE,\ fv})/(T_{P\_RE,\ fv} + N_{P\_RE,\ fv}) < 0]$ and/or $[(T_{A\_LE,\ fv} - N_{A\_LE,\ fv})/(T_{A\_LE,\ fv} + N_{A\_LE,\ fv}) > 0$ and $(T_{A\_RE,\ fv} - N_{A\_RE,\ fv})/(T_{A\_RE,\ fv} + N_{A\_RE,\ fv}) < 0]$.

In another embodiment, for a left-handed wearer, $[(T_{P\_LE,fv} - N_{P\_LE,fv})/(T_{P\_LE,fv} + N_{P\_LE,fv}) > 0.15$, preferably $>0.20$, preferably $>0.25$, preferably $>0.30$ and $(T_{P\_RE,fv} - N_{P\_RE,fv})/(T_{P\_RE,fv} + N_{P\_RE,fv}) < -0.15$, preferably $<-0.20$, preferably $<-0.25$, preferably $<-0.30]$ and/or $[(T_{A\_LE,fv} - N_{A\_LE,fv})/(T_{A\_LE,fv} + N_{A\_LE,fv}) > 0.15$, preferably $>0.20$, preferably $>0.25$, preferably $>0.30$ and $(T_{A\_RE,fv} - N_{A\_RE,fv})/(T_{A\_RE,fv} + N_{A\_RE,fv}) < -0.15$, preferably $<-0.20$, preferably $<-0.25$, preferably $<-0.30]$.

Lens with an Asymmetry of an Optical Parameter Between Nasal and Temporal Parts as a Function of Handedness In one aspect, the ophthalmic lens of the invention is asymmetric in that at least one optical parameter between the nasal part and the temporal part of the lens is asymmetric as a function of the wearer's handedness. Said parameter may be selected from any one of central vision optical criteria (CVOC) selected from the group comprising: power in central vision, astigmatism in central vision, high order aberration in central vision, acuity in central vision, prismatic deviation in central vision, ocular deviation, object visual field in central vision, image visual field in central vision, magnification in central vision, or a variation of preceding criteria;

any one of peripheral vision optical criteria (PVOC) selected from the group comprising: power in peripheral vision, astigmatism in peripheral vision, high order aberration in peripheral vision, pupil field ray deviation, object visual field in peripheral vision, image visual field in peripheral vision, prismatic deviation in peripheral vision, magnification in peripheral vision, or a variation of preceding criteria;

any one of global optical criteria (GOC) selected from the group comprising: magnification of the eye, temple shift, or a variation of preceding criteria;

any one of surface criteria (SC) selected from the group comprising: front or back mean curvature, front or back minimum curvature, front or back maximum curvature, front or back cylinder axis, front or back cylinder, front or back mean sphere, front or back maximum sphere, front or back minimum sphere or a variation of preceding criteria; and/or the maximal value (respectively, minimal value, peak-to-valley value, maximal gradient value, minimal gradient value, maximal slope value, minimal slope value, average value) of any one of the preceding criteria, in one or more useful zones of the lens, including zones for near-vision, distant-vision, and intermediate-vision.

For example, said optical parameter may be the maximal value (respectively, minimal value, peak-to-valley value, maximal gradient value, minimal gradient value, maximal slope value, minimal slope value, average value) of any one of: resulting astigmatism, refractive power gradient, mean sphere gradient of the front surface, cylinder of the front surface, in one or more useful zones of the lens for near-vision, distant-vision, and intermediate-vision.

In a preferred embodiment, said optical parameter asymmetric between the nasal part and the temporal part of the lens is selected from maximal resulting astigmatism, maximal power gradient, mean sphere gradient of the front surface, cylinder of the front surface. Advantageously, when the optical parameter is maximal resulting astigmatism, reduced blur and reduced image deformation are experienced on the side of the lens mainly used by the wearer. Further, when the optical parameter is maximal power gradient, the gaze alignment on the target is made easier on the side of the lens mainly used by the wearer. The invention thus provides enhanced experience of handedness and improved visual comfort as a function of the wearer's handedness.

In one aspect, the ophthalmic lens of the invention is asymmetric in that both the above defined nasal/temporal half-widths and the above defined at least one optical parameter between the nasal part and the temporal part of the lens are asymmetric as a function of the wearer's handedness.

In one aspect, the ophthalmic lens of the invention is asymmetric in that at least one optical parameter between the nasal part and the temporal part of the lens is asymmetric as a function of the wearer's handedness, and said optical parameter is maximal resulting astigmatism (MaxAsr), defined respectively on the temporal side (MaxAsrT) and on the nasal side (MaxAsrN) of the lens. In such case, the customization of the maximal resulting astigmatism (peak values) advantageously allows to soften the design of the lens as a function of the wearer's handedness. For example, for a right-handed wearer, the design may be softened on the right side, namely softened on the temporal side T of the right-eyed RE lens, and/or on the nasal side N of the left-eye LE lens; whereas for a left-handed wearer, the design may be softened on the left-side.

In one embodiment, the invention provides a lens intended for a right-handed wearer, wherein MaxAsrT−MaxAsrN>0. The lens is preferably intended for the left eye of the wearer.

In another embodiment, the invention provides a lens intended for a right-handed wearer, wherein MaxAsrT−MaxAsrN<0. The lens is preferably intended for the right eye of the wearer.

In another embodiment, the invention provides a lens intended for a left-handed wearer, wherein MaxAsrT−MaxAsrN<0. The lens is preferably intended for the left eye of the wearer.

In another embodiment, the invention provides a lens intended for a left-handed wearer, wherein MaxAsrT−MaxAsrN>0. The lens is preferably intended for the right eye of the wearer.

The above lenses may be paired so as to form a pair of lenses (RE/LE).

In one aspect, the ophthalmic lens of the invention is asymmetric in that maximal resulting astigmatism (MaxAsr) is asymmetric between the nasal part N and the temporal part T of the lens as a function of the wearer's handedness, wherein (MaxAsrT)−(MaxAsrN) depends on the value of prescribed addition.

In one embodiment, the invention provides a lens intended for a right-handed wearer having a prescribed addition A, wherein MaxAsrT−MaxAsrN>Max(0.25*A−0.25; 0.25). The lens is preferably intended for the left eye of the wearer.

In another embodiment, the invention provides a lens intended for a right-handed wearer having a prescribed addition A, wherein MaxAsrT−MaxAsrN<−Max(0.25*A−0.25; 0.25). The lens is preferably intended for the right eye of the wearer.

In another embodiment, the invention provides a lens intended for a left-handed wearer having a prescribed addition A, wherein MaxAsrT−MaxAsrN<−Max(0.25*A−0.25; 0.25). The lens is preferably intended for the left eye of the wearer.

In another embodiment, the invention provides a lens intended for a left-handed wearer having a prescribed addition A, wherein MaxAsrT−MaxAsrN>Max(0.25*A−0.25; 0.25). The lens is preferably intended for the right eye of the wearer.

The above lenses may be paired so as to form a pair of lenses (RE/LE).

In another aspect, the asymmetry between nasal and temporal sides may be defined as follows in the context of a pair: for a right-handed wearer having a prescribed addition A, MaxAsrT_LE−MaxAsrN_LE>Max(0.25*A−0.25; 0.25) and MaxAsrT_RE−MaxAsrN_RE<−Max(0.25*A−0.25; 0.25); whereas for left-handed wearer having a prescribed addition A, MaxAsrT_LE−MaxAsrN_LE<−Max(0.25*A−0.25; 0.25) and MaxAsrT_RE−MaxAsrN_RE>Max(0.25*A−0.25; 0.25).

In the above embodiments, +/−Max(0.25*A−0.25; 0.25) is expressed in diopters (D) and Max denotes the Maximum Value function between (0.25*A−0.25) and 0.25.

In one aspect, the invention relates to an ophthalmic lens, wherein the lens is asymmetric in that at least one optical parameter ($\pi$) between the nasal (N) part and the temporal (T) part of the lens is asymmetric as a function of the wearer's handedness. In one aspect:

$$\Delta 1 = ABS[(\pi_T - \pi_N)/avg(\pi_T; \pi_N)] > 0.15$$

wherein:
ABS is absolute value,
avg denotes the average value.

Preferably the lens of the invention is such that $\Delta 1 > 0.20$; $\Delta 1 > 0.25$; or $\Delta 1 > 0.30$.

In some embodiments, it is the maximal value of resulting astigmatism MaxAsr or the maximal value of refractive power gradient.

Pair of Lenses with an Asymmetry Between Left and Right Lenses as a Function of Handedness The invention also relates to a pair of ophthalmic lenses intended to be worn by a wearer, wherein each lens is asymmetric in that at least a same one optical parameter ($\pi$) between the nasal (N) part and the temporal (T) part of each respective lens is asymmetric as a function of the wearer's handedness, and wherein further the asymmetries are of opposite signs between the eyes. The invention thus provides a pair of ophthalmic lenses intended to be worn by a wearer having right eye (RE) and left eye (LE), wherein:

ABS $[(\pi_{T\_RE} - \pi_{N\_RE})/avg(\pi_{T\_RE}; \pi_{N\_RE})] > 0.15$ (preferably, 0.20, 0.30); and ABS $[(\pi_{T\_LE} - \pi_{N\_LE})/avg(\pi_{T\_LE}; \pi_{N\_LE})] > 0.15$ (preferably, 0.20, 0.30); and optionally $(\pi_{T\_RE} - \pi_{N\_RE})/avg(\pi_{T\_RE}; \pi_{N\_RE})$ and $(\pi_{T\_LE} - \pi_{N\_LE})/avg(\pi_{T\_LE}; \pi_{N\_LE})$ are of opposite signs.

In such situation, the asymmetry for the right eye is not identical to the asymmetry for the left eye, thus providing for additional asymmetry at the scale of the full pair of lenses.

In another aspect, the present invention provides a pair of ophthalmic lenses intended to be worn by a wearer having right eye (RE) and left eye (LE), wherein said pair of lenses is asymmetrical between the LE and the RE as a function of the wearer's handedness. For example, the invention provides a pair of lenses, wherein said pair is asymmetrical in that for at least one optical parameter ($\pi$) defined on the lens intended for the right eye ($\pi_{RE}$) and defined on the lens for the left eye ($\pi_{LE}$), the amount $\pi_{RE} - \pi_{LE}$ is a function of the wearer's handedness. Advantageously, this enable the design of a pair of lenses, which (all other things being equal, including prescription data, biometry data, frame data, etc.), would yield a lens pair design different for a left-handed wearer and a right-handed wearer. The extent of the differences in design may vary according to the degree of handedness. According to one embodiment:

$(\pi_{RE} - \pi_{LE})/avg(\pi_{RE}; \pi_{LE}) = aH + b$; and optionally ABS $[(\pi_{RE} - \pi_{LE})/avg(\pi_{RE}; \pi_{LE})] > 0.15$;

wherein
ABS is absolute value,
avg denotes the average value,
a and b are constants,
H is a handedness parameter.

(a,b) are constants in that they do not depend on handedness in any way. (a,b) may depend on wearer data other than handedness data, such as wearer prescription data or biometry data. H is a handedness parameter that solely depends on the wearer's handedness. H may be the handedness value as described thereafter and in the examples.

H may be determined according to any handedness determination method as per the present disclosure. The skilled person may determine suitable (a,b) values based upon the present disclosure and common general knowledge. Preferably, (a,b) are selected so that $\Delta2=ABS\ [(\pi_{RE}-\pi_{LE})$ avg $(\pi_{RE};\ \pi_{LE})]>0.15$. Preferably (a,b) are selected so that $\Delta2>0.20;\ \Delta2>0.25;\ \Delta2>0.30$.

Pair of Lenses with Insets Asymmetric as a Function of Handedness

The present invention provides a pair of spectacle progressive ophthalmic lenses intended to be worn by a wearer having a right eye and a left eye, wherein the respective insets are different as a function of the wearer's handedness. Namely, the inset of the lens for the right eye is different from the inset of the lens for the left eye, as a function of the wearer's handedness.

In one aspect, for a wearer having identical prescription data for the right eye and the left eye:
  For a right-handed wearer: Inset_LE>Inset_RE
  For a left-handed wearer: Inset_RE>Inset_LE In another aspect, the inset for each lens (inset_RE_initial and inset_LE_initial) may be first determined without taking into account wearer handedness. The skilled person is aware of methods for determining inset values, for example by ray tracing methods, such as ray tracing method with respect to an object in the near-vision in the median plane. The values for inset_RE_initial and inset_LE_initial may be determined as a function of the prescription data, and where applicable, other parameters, such as in accordance with WO2010034727.

Inset values that take into account handedness may then be determined as follows: for a right-handed wearer:
  Inset_RE=inset_RE_initial−Delta_inset,
  Inset_LE=inset_LE_initial+Delta_inset
while for a left-handed wearer:
  Inset_RE inset_RE_initial+Delta_inset
  Inset_LE=inset_LE_initial−Delta_inset,
wherein Delta_inset>0.

Delta_inset may be determined as follows:

$$Delta\_inset=[CRE\_L/RD]*DPS$$

wherein
  DPS=Distance between the sagittal plan and the gazed point in near vision, positive towards the right side of the individual.
  CRE_L=distance between the center of rotation of the eye and the lens; CRE_L is defined for the left eye (CRE_L_LE) and right eye (CRE_L_RE)
  RD reading distance from the center of rotation of the eye.

Delta_inset may also be determined as follows:

$$Delta\_inset=DPS/[1+W/CRE\_L-W*P]$$

wherein
  DPS=Distance between the sagittal plan and the gazed point in near vision, positive towards the right side of the individual.
  CRE_L=distance between the center of rotation of the eye and the lens, in meter.
  W=reading distance from the lens, in meter.
  P=power of the lens in near vision, in diopter. For example, where the wearer has identical prescription for both eyes, one may choose Delta_inset=about 1 mm. Inset values that take into account handedness may be also determined as follows: inset values can be determined by a calculation, a ray-tracing or any other method, using modified values of the monocular pupillary-distance PD_RE' and PD_LE', such as:

PD_RE'=PD_RED−PS
  PD_LE'=PD_LE+DPS
wherein
  DPS=Distance between the sagittal plan and the gazed point in near vision, positive towards the right side of the wearer.
  PD_RE=Monocular pupillary distance of the right eye of the wearer.
  PD_LE=Monocular pupillary distance of the left eye of the wearer.

For example, the inset can be calculated according to:

$$Inset\_RE=PD\_RE'/[1+W/CRE\_L\_RE-W*P\_RE]$$

$$Inset\_LE=PD\_LE'/[1+W/CRE\_L\_LE-W*P\_LE]$$

wherein
  CRE_L_RE=distance between the center of rotation of the right eye and the lens, in meter.
  CRE_L_LE=distance between the center of rotation of the left eye and the lens, in meter.
  W=reading distance from the lens, in meter.
  P_RE=power of the right lens in near vision, in diopter.
  P_LE=power of the left lens in near vision, in diopter.

Figure 21:
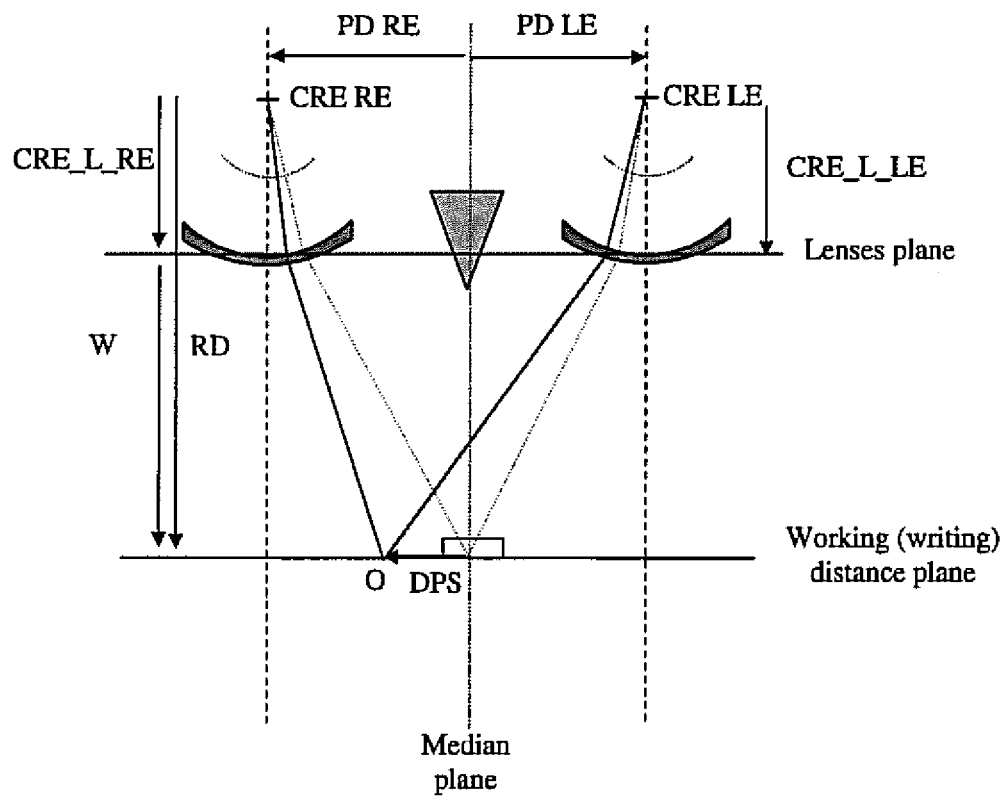

All the above definitions of Delta_inset are illustrated at FIG. 21, wherein O is the object point gazed in near vision.

Range of Ophthalmic Lenses Defined as a Function of Handedness

In another aspect, the present invention provides a range of ophthalmic lenses. Said range of lenses comprises:
  a set of ophthalmic lenses suitable for a right-handed wearer, and
  a set of ophthalmic lenses suitable for a left-handed wearer.

For example, said range of lenses can correspond to a commercial product range of lenses. Said lenses are suitable for a wearer according to the wearer's handedness, thus providing for a product range which is segmented according to wearer's handedness. In one embodiment, the lenses in the range are in part or all designed as a function of the wearer's handedness. For example, part or all of the lenses in the range are asymmetric as a function of the wearer's handedness as explained above. Preferably, said lenses are asymmetric as defined above with respect to nasal/temporal half-widths and/or with respect to at least one optical parameter between the nasal part and the temporal part of the lens.

Lenses with Asymmetric Markings as a Function of Handedness

The invention also provides a pair of progressive (preferably multifocal) ophthalmic lenses intended to be worn by a wearer, wherein the markings on the lenses are asymmetric. Said marking may be a marking for locating a reference point on the lens, for example for locating a reference point in the distant-vision zone, or for locating a reference point in the near-vision zone. The invention thus provides a pair of lenses, each of said lens comprising:
  a distant-vision zone;
  a near-vision zone; and
  one mark for locating a reference point of the near-vision zone (respectively one mark for locating a reference point of the distant-vision zone),
wherein the distances between a vertical axis passing through the Prism Reference Point (PRP) of the lens and respectively:

the mark for locating a reference point of the near-vision zone (respectively one mark for locating a reference point of the distant-vision zone) on the lens intended for a first eye, and the mark for locating a reference point of the near-vision zone (respectively one mark for locating a reference point of the distant-vision zone) on the lens intended for a second eye are different. In one embodiment, the difference between said distances is determined as a function of the wearer's handedness.

Figure 20:
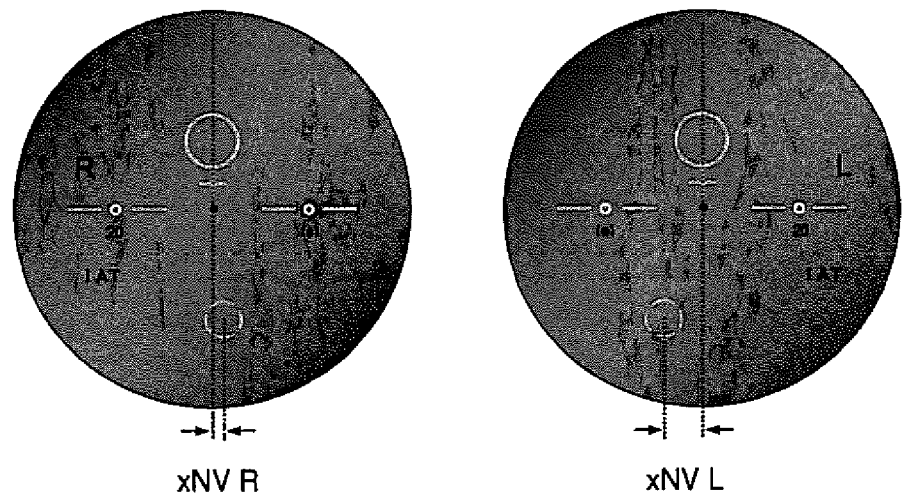

This is illustrated by FIG. 20, wherein marks for locating a reference point of the near vision zone are shown. The distances xNV_R for the right lens and xNV_L for the left lens are different.

Medical Use/Indication

The present invention further relates to a medical indication, wherein the indication is partly defined by the nature of the patient to be treated. Namely, the invention provides a medical use for any ophthalmic lens material composition for use in providing spectacle ophthalmic lenses intended to be worn by a wearer, wherein the lenses are designed as a function of the wearer's handedness. Such lenses are for meeting the patient's (wearer's) prescription, thus for providing optical correction to patients suffering from ametropia, for example myopia or hyperopia, astigmatism, presbyopia.

Handedness Determination

According to the invention, the lens wearer's handedness may be determined in various ways:
- as the answer of the wearer when asked whether (s)he is left-handed or right-handed for a writing task/activity;
- as the answer of the wearer when asked whether (s)he is left-handed or right-handed for a writing task/activity, in combination with the answer of the wearer when asked whether (s)he uses a posture such as hooked writing or regular writing. "Hooked" writing refers to an arm posture such that the wrist of the writing hand is bent at an angle, generally approximately a right angle, between the forearm and the hand. This is opposed to a "regular" handwriting, where the wrist of the writing hand is generally not bent, so that the hand and the forearm are aligned. The answer may then be hooked left (resp. right)-handed or regular left (resp. right)-handed.
- as the conclusion from an observation of the wearer (human external assessment), including observation of the writing hand and of the above hooked/regular posture feature,
- as the laterality quotient as determined using the Edinburgh Inventory, as per Oldfield, R. C. "*The assessment and analysis of handedness: the Edinburgh inventory*." Neuropsychologia. 9(1):97-113. 1971;
- as the laterality quotient as determined by analogy to the Edinburgh Inventory and following the same computation principle, but based on the answers of the wearer to one or more handedness questions, for example 1-5 or 1-10 questions, which are distinct/adapted from said Inventory; this would amount to a Edinburgh-like modified handedness Inventory. Notably, it is possible to define various such modified inventories: general inventories, distant-vision tasks inventories, intermediate-vision tasks inventories, near-vision task inventories (see example);
- physical testing and/or measurements such as head/eye tracking, and/or document tracking and/or hand tracking. A handedness parameter/value may also be computed as a function of a head/eye behaviour score. The head/eye behaviour score can be measured using an apparatus known under the name Visioffice or Vision Print System, or the head/eye behaviour score can be determined by eye tracking, such as SMI Eye tracking glasses (SensoMotoric Instrument), ASL eye tracking glasses (Applied Science Laboratories), etc.

Independently of the nature of the method used to determine a wearer's handedness, it is possible to define a handedness value H. Said value may be determined according to various methods.

In one embodiment, the wearer is asked a single question, for example which hand s/he uses to perform hand writing. If the answer is "right", then the handedness is determined as "right-handed" and a handedness value H of +100 can be allocated. If the answer is "left", then the handedness is determined as "left-handed" and a handedness value H of −100 can be allocated.

In another embodiment, handedness value H may be determined in accordance with the Edinburgh Inventory. The protocol is as described by Oldfield, R. C. "*The assessment and analysis of handedness: the Edinburgh inventory*." Neuropsychologia 9(1):97-113 (1971). In accordance with this method, the subject is asked a series of handedness related questions and is to answer quantitatively. The outcome is a laterality quotient LQ, which ranges from −100 (very left-handed) to +100 (very right-handed). Accordingly, a handedness value H can be defined as the LQ value obtained following this method.

In another embodiment, handedness value H may be determined in accordance with modified Edinburgh inventories. It is possible to follow the same principle of quotient computing as per Oldfield, R. C. "*The assessment and analysis of handedness: the Edinburgh inventory*." Neuropsychologia. 9(1):97-113 (1971), but with modifications regarding the nature of the questions. In particular, it is possible to define H=LQ values for distant-vision (respectively intermediate vision, respectively near-vision), by listing questions related to tasks using distant-vision (respectively intermediate vision, respectively near-vision). For example, near-vision tasks that may be used to define near-vision LQ may include one or more of: write on a piece of paper, dial a number on a desk phone, dial a number on a portable/cell phone, navigate on a touch screen (e-tablet, smart phone), stir contents of a pot or a pan, shave or apply makeup. Example of far-vision task: point towards a plane in the sky, or any other distant point; bow shooting. Example of intermediate-vision tasks: start up the dishwasher or the oven; reach for an item placed on a high shelf. The subject is provided with the following questionnaire:

| Which hand do you use to perform | Left | Right |
|---|---|---|
| Task 1 | | |
| Task 2 | | |
| Task 3 (etc) | | |

The subject is asked to please indicate his/her preferences in the use of hands in each task by putting "+" in the appropriate column. If the preference is so strong that one would never try to use the other hand unless absolutely forced, one puts "++". If in any case the subject is indifferent, put "+" in both column. LQ is defined as [(number of "+" in "right" column)−(number of "+" in "left" column)/number of "+"]*100.

Eyeglasses Designed as a Function of Handedness

The present invention provides spectacles (eyeglasses) for enhanced experience of handedness. The eyeglasses of the invention provide improved wearer comfort, including improved visual comfort and/or improved usage comfort.

In one aspect, the present invention provides spectacles comprising ophthalmic lenses and a handedness-specific frame. The frame may exhibit one or more of the following handedness-dependent features:

- a grip pad placed on the preferred hand of the wearer for putting on/removing the spectacles. For example, for a wearer who favors the right hand to put on/removing spectacles, a grip pad may be placed on the right arm of the frame. The pad may be of any gripping material such as thermoplastic materials. Idem for a wearer who favors the left hand to put on/remove the glasses;
- a reinforcement on one arm of the frame corresponding to the most solicited side the frame (e.g. right arm for a wearer who favors the right hand to put on/removing spectacles);
- specific asymmetric arm features depending on the order in which the wearer favors to fold the arms;
- asymmetric sizes of lenses, i.e. one of the lenses is larger than the other one; for example a larger lens for the right (resp. left) eye of a right (resp. left)-handed wearer;
- where the spectacles are "information eyeglasses", i.e. spectacles that allow the display of information on part of the lenses fitted in the frame, the location of the display and/or the location of the activating means (switch) may be designed for improved handedness experience. For example, for a right-handed, the wearer may elect to select one lens over the other for the location of the display. Similarly, the location of the activating means may be selected as a function of the wearer's handedness (on the right for a right-handed wearer; alternatively, on the left if the right-handed wearer prefers keeping the right hand free for other tasks such as writing.

In another aspect, the present invention provides handedness-specific eyeglasses wherein the lenses are fitted in an asymmetric manner, as a function of the wearer's handedness.

In one embodiment, lens fitting may be customized according to wearer handedness. Fitting parameters (inter-pupillary distance, fitting height for each lens) may be customized according to wearer handedness.

For example, one may choose PD_RE=PD_RE delta and PD_LE=PD_LE+delta, wherein PD designates the pupillary distance.

Figure 19:
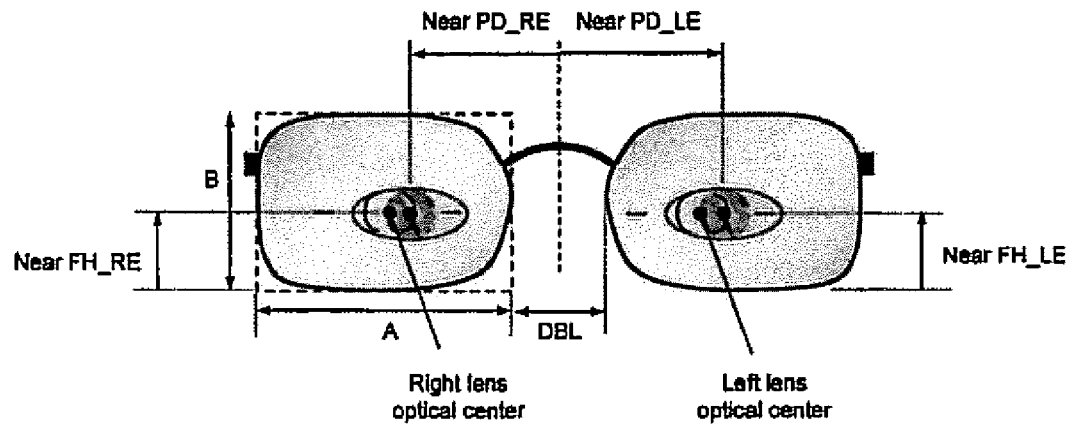

This is illustrated by FIG. 19 showing eyeglasses with asymmetric fitting for near vision unifocal lenses, wherein Near FH is the fitting height in near vision, Near PD is the near vision pupillary distance, A, B are the frame dimensions, DBL is the horizontal distance between lenses.

The invention is illustrated by the following non-limiting examples.

Example 1

Progressive Lens Designs with Asymmetric Temporal/Nasal Half-Widths in Near Vision (Power and Astigmatism) as a Function of Wearer Handedness All parameters in Example 1 relate to near-vision, but are not annotated as such for simplification purposes.

Example 1A

Near-Vision Behavior is Handedness-Dependent

Figure 8:
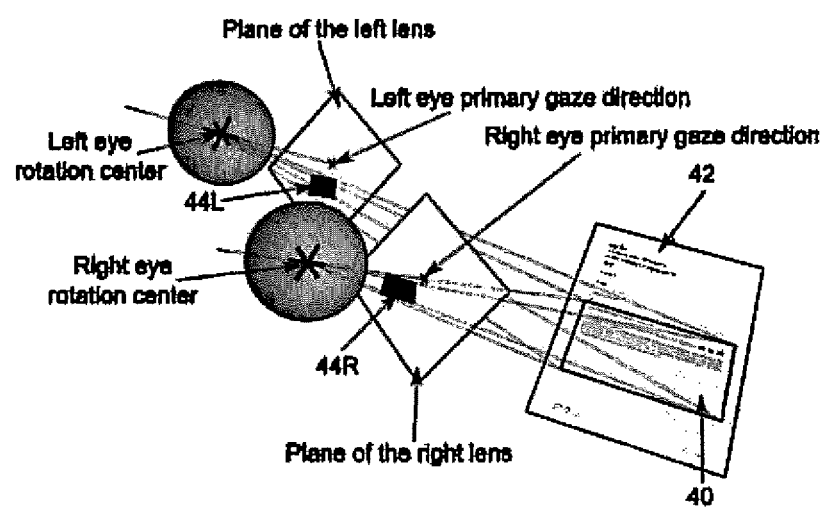
FIG. 8 shows an optical system of eyes and lenses when executing a near vision task.

Protocol:

The specific near vision task of writing on a sheet of paper is then considered for a group of test individuals. To this end, as illustrated in FIG. 8, a writing zone 40 of a document 42 is considered and defined as the area of the document 42 where the subject is writing. Each person of the group is placed in the condition of writing on the writing zone 40. At this time, the projection 44L, 44R of the writing zone 40 in the plane of the left and the right lens is computed, recorded and analyzed. These projections 44L, 44R are also called useful near vision zones or simply useful zones in the remainder of the description.

Figure 9:
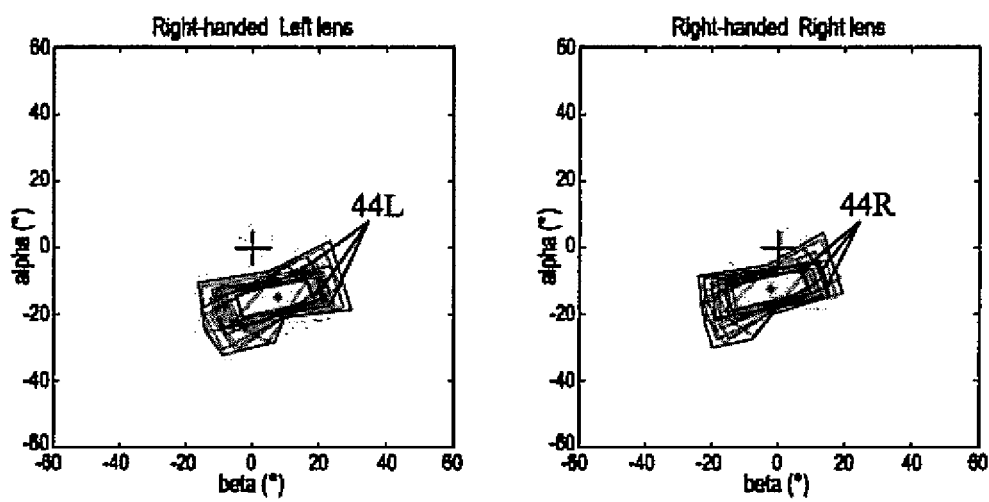
FIGS. 9 and 10 show envelopes of gaze directions corresponding to useful zone when swept by the optical system of FIG. 8.
Figure 10:
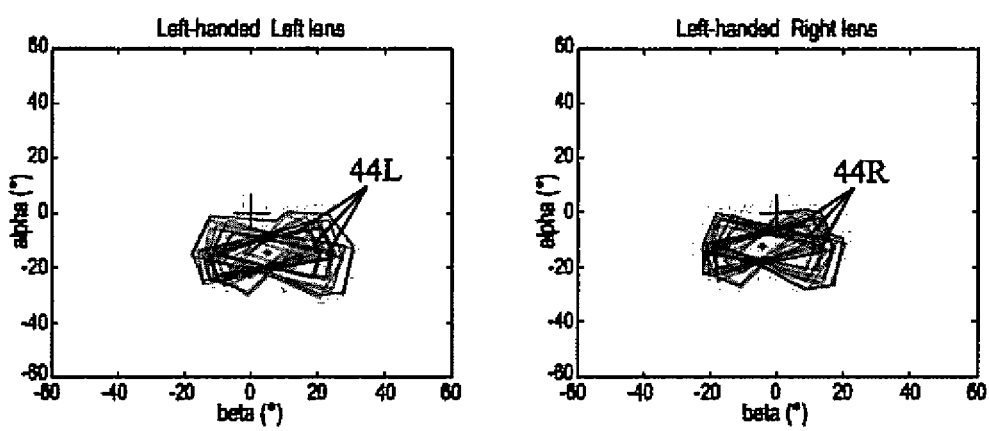

Results:

FIG. 9 shows superposition of the useful zones 44L, 44R recorded for right-handed persons who sustained the experience and FIG. 10 shows superposition of the useful zones 44L, 44R for left-handed persons who sustained the experience.

From these FIGS. 9-10, it can be seen that the useful zones 44L, 44R greatly differ between right-handed and left-handed persons.

Besides, there is a high variability of the useful zones among left-handed persons, leading to a mean useful zone which is large and substantially aligned along an axis parallel to the horizontal axis ($\alpha=0°$). On the contrary, among right-handed persons, the variability of the useful zones is reduced, leading to a mean useful zone which is smaller and substantially inclined relative to the horizontal axis. Table 1 summarizes the useful zones identified.

The useful zones 44L, 44R can thus be exploited based on their orientation relative to the horizontal axis.

TABLE 1

|  | Left-handed | | Right-handed | |
| --- | --- | --- | --- | --- |
|  | Left lens | Right lens | Left lens | Right lens |
| Minimum angle of inclination (°) | −26 | −28 | 7 | 7 |
| Maximum angle of inclination (°) | 52 | 49 | 54 | 48 |
| Standard deviation (°) | 22 | 22 | 12 | 11 |
| Mean angle of inclination (°) | 7 | 6 | 20 | 19 |

Based on the data collected and expressed in Table 1, on average, the right-handed persons incline the document 42 by an angle of about 20° when performing a near vision task such as writing, whereas for the left-handed persons, the inclination is not significantly different from 0°, so the mean inclination angle is considered to be 0°.

Conclusion:

Such a high variability in the orientation of document 42 in writing tasks demonstrates the existence of specific behaviors between right-handed and left-handed persons and therefore implies a need to provide different designs in near vision for right-handed and left-handed wearers. Particularly, the near vision zone of the lenses have to be adapted to match in an optimal way the mean projection on the respective lenses of the useful zone swept during a near vision task.

Example 1B

Asymmetrizing Lens Nasal/Temporal Half-Widths (Power, Astigmatism) in Near-Vision as a Function of Handedness; Determination of Useful Vision Zones The present example provides two different designs of a pair of progressive ophthalmic lenses, one specific design for left-handed persons and one specific design for right-handed persons. This example relates to lens design in the near-vision zone with asymmetric features for nasal and temporal near-vision half-widths.

The criteria taken into account in the following are the ratio $R_{PL}$, $R_{PR}$ of the difference over the sum of temporal and nasal half-widths of refractive power for the left-eye lens and the right-eye lens, and the ratio $R_{AL}$, $R_{AR}$ of the difference over the sum of temporal and nasal half-widths of module of resulting astigmatism for the left-eye lens and the right-eye lens:

$$R_{PL} = \frac{T_{P\_LE} - N_{P\_LE}}{T_{P-LE} + N_{P\_LE}}$$

$$R_{PR} = \frac{T_{P\_RE} - N_{P\_RE}}{T_{P-RE} + N_{P\_RE}}$$

$$R_{AL} = \frac{T_{A\_LE} - N_{A\_LE}}{T_{A-LE} + N_{A\_LE}}$$

$$R_{AR} = \frac{T_{A\_RE} - N_{A\_RE}}{T_{A-RE} + N_{A\_RE}}$$

For each lens of the pair, at least one criterion is determined based on the laterality of the wearer, that is to say either the ratio of refractive power $R_P$ or the ratio of module of resulting astigmatism $R_A$ or both.

According to the results summarized in Table 1 above and explained with reference to FIGS. 9 and 10, the chosen criterion is determined differently for the left-handed and right-handed persons.

For the left-handed persons, as the inclination relative to the horizontal axis of the projections of the writing zone 40 on the plane of the left-eye and right-eye lenses is substantially equal to 0', the design for both the left-eye and right-eye lenses is symmetric relative to the corresponding proximate vision gaze direction $(\alpha_{PVL}, \beta_{PVL})$, $(\alpha_{PVR}, \beta_{PVR})$ This condition is expressed by the fact that, for the left-handed persons, the ratio of the difference over the sum of temporal and nasal half-widths of refractive power is set substantially to 0 for each lens of the pair and/or the ratio of the difference over the sum of temporal and nasal half-widths of module of resulting astigmatism is set substantially to 0 for each lens of the pair:

$R_{PL}=R_{PR}=0$ and/or $R_{AL}=R_{AR}=0$

These equations result in the fact that, for the left-handed persons, the left and right temporal half-widths of refractive power are substantially equal respectively to the left and right nasal half-widths of refractive power and/or the left and right temporal half-widths of module of resulting astigmatism are substantially equal respectively to the left and right nasal half-widths of module of resulting astigmatism:

$T_{P\_LE}=N_{P\_LE}$ and $T_{P\_RE}=N_{P\_RE}$ and/or $T_{A\_LE}=N_{A\_LE}$ and $T_{A\_RE}=N_{A\_RE}$ Table 2 summarizes the values of the criteria of resulting astigmatism $R_{AL}$, $R_{AR}$ for the left-handed persons, for a proximate vision gaze direction where the refractive power reaches $P_{FV}$ plus 85% of the prescribed addition and for a proximate vision gaze direction where the refractive power reaches $P_{FV}$ plus 100% of the prescribed addition.

TABLE 2

| Left-handed criteria | $P_{\alpha PV, \beta PV} =$ $P_{FV} + 85\% * A$ | $P_{\alpha PV, \beta PV} =$ $P_{FV} + 100\% * A$ |
|---|---|---|
| Mean value | 0.00 | 0.00 |
| Tolerance range | ±0.12 | ±0.12 |
| Preferred value | 0.00 | 0.00 |

For the right-handed persons, as the projections of the writing zone 40 on the plane of the left-eye and right-eye lenses is inclined by an angle of about 20° relative to the horizontal axis, the design for both the left-eye and right-eye lenses is dissymmetric relative to the corresponding proximate vision gaze direction $(\alpha_{PVL}, \beta_{PVL})$, $(\alpha_{PVR}, \beta_{PVR})$. This condition is expressed by the fact that, for the right-handed persons, the ratio of the difference over the sum of temporal and nasal half-widths of refractive power is set to a value greater than 0 for the right-eye lens and the ratio of the difference over the sum of temporal and nasal half-widths of refractive power is set to a value less than 0 for the left-eye lens and/or the ratio of the difference over the sum of temporal and nasal half-widths of module of resulting astigmatism is set to a value greater than 0 for the right-eye lens and the ratio of the difference over the sum of temporal and nasal half-widths of module of resulting astigmatism is set to a value less than 0 for the left-eye lens:

$R_{PR}>0$ and $R_{PL}<0$ and/or $R_{AR}>0$ and $R_{AL}<0$

These equations result in the fact that, for the right-handed persons, the right temporal half-width of refractive power is greater than the right nasal half-width of refractive power and the left temporal half-width of refractive power is less than the left nasal half-width of refractive power and/or the right temporal half-width of module of resulting astigmatism is greater than or equal substantially to the right nasal half-width of module of resulting astigmatism and the left temporal half-width of module of resulting astigmatism is less than or equal substantially to the left nasal half-width of module of resulting astigmatism:

$T_{P\_RE}>N_{P\_RE}$ and $T_{P\_LE}<N_{P\_LE}$ and/or $T_{A\_RE}>N_{A\_RE}$ and $T_{A\_LE}<N_{A\_LE}$ In particular, for the right-handed persons, the sum of the ratio of the difference over the sum of temporal and nasal half-widths of refractive power for the right-eye lens and the ratio of the difference over the sum of temporal and nasal half-widths of refractive power for the left-eye lens is set substantially to 0 and/or the sum of the ratio of the difference over the sum of temporal and nasal half-widths of module of resulting astigmatism for the right-eye lens and the ratio of the difference over the sum of temporal and nasal half-widths of module of resulting astigmatism for the left-eye lens is set substantially to 0:

$$R_{PR}+R_{PL}=0$$

and/or $$R_{AR}+R_{AL}=0$$

Table 3 summarizes the values of the criteria of resulting astigmatism $R_{AL}$, $R_{AR}$ for the right-handed persons, for a proximate vision gaze direction where the refractive power reaches $P_{FV}$ plus 85% of the prescribed addition and for a proximate vision gaze direction where the refractive power reaches $P_{FV}$ plus 100% of the prescribed addition.

TABLE 3

| Right-handed criteria | $P_{\alpha PV,\beta PV} =$ $P_{FV}$ + 85% * A | $P_{\alpha PV,\beta PV} =$ $P_{FV}$ + 100% * A |
|---|---|---|
| Right-eye lens values | >0.12 | >0.12 |
| Preferred right-eye lens value | 0.15 | 0.20 |
| Left-eye lens values | <−0.12 | <−0.12 |
| Preferred left-eye lens value | −0.15 | −0.20 |

Therefore, the invention provides two specific designs for a pair of progressive ophthalmic lenses according to the laterality of the wearer.

According to another aspect, the invention provides a process for determining a pair of personalized progressive ophthalmic lenses intended for a particular wearer.

This process differs from the above process relating to a left-handed/right-handed segmentation in that the useful near vision zones 44L, 44R of this wearer and the inclination of the useful near vision zones 44L, 44R are measured and the criteria are determined based on the measured inclination.

Consequently, the obtained design is adapted to this particular wearer and not to the average of the left-handed or right-handed persons.

Obviously, other near vision tasks such as reading, writing on a computer, using a smartphone, etc. could be considered.

According to the invention, the design can be further refined by taking into account the head/eye behaviour of the wearer. Indeed, when executing a near vision task, some persons rather tend to move their eyes and other persons rather tend to move their head. The inventors have found that, for an eye mover wearer, the areas of the lenses actually used correspond to the full projections on the lenses of the writing zone 40, whereas for a head mover wearer, the areas of the lenses actually used correspond to a fraction of the projections on the lenses of the writing zone 40. A head/eye behaviour score can be calculated and the projection of the writing zone 40 can be weighted by a coefficient which depends on the head/eye behaviour score. The head/eye behaviour score can be measured using an apparatus known under the name Visioffice or Vision Print System, or the head/eye behaviour score can be determined by eye tracking, such as SMI Eye tracking glasses (SensoMotoric Instrument), ASL eye tracking glasses (Applied Science Laboratories), etc.

Example 1C

Specific Lens Designs

FIGS. 11 to 18 and 19a to 22a give optical characteristics of the lenses considered.

FIGS. 11, 13, 15, 17, 19a and 21a are refractive power maps. The vertical and horizontal axes of the maps are the values of the lowering angle α and azimuth angle β of the gaze directions. The isometric curves indicated on these maps connect gaze directions which correspond to a same refractive power value. The respective refractive power values for the curves are incremented by 0.25 δ between neighbouring curves, and are indicated on some of these curves.

FIGS. 12, 14, 16, 18, 20a and 22a are resulting astigmatism maps. The axes of these maps are similar to those of the refractive power maps and the isometric curves indicated on these maps connect gaze directions which correspond to a same resulting astigmatism value. Each of these maps also show the meridian line.

On each of these maps, three specific points PV, A and B are considered.

Point PV corresponds to the proximate vision gaze direction which is related to the proximate vision control point.

In the examples below, point PV is the point on the front surface of the lens intersecting the gaze direction where the refractive power reaches the far vision mean power prescribed for that lens plus 100% of the addition prescribed for that lens.

Point A is located on the temporal side of the lens such that the distance between point A and point PV corresponds to the temporal half-width as defined above.

Point B is located on the nasal side of the lens such that the distance between point B and point PV corresponds to the nasal half-width as defined above.

PAIR1—FIGS. 11 to 14: Right-Handed Wearer. Optimisation for Resulting Astigmatism A pair PAIR1 of progressive ophthalmic lenses according to the invention is intended for a right-handed wearer and has been optimized in terms of resulting astigmatism.

In this case, the power prescription is +0.75 δ in far vision and the prescribed addition is 1.50 δ for both lenses of the pair. No astigmatism is prescribed for the wearer.

Figure 11:
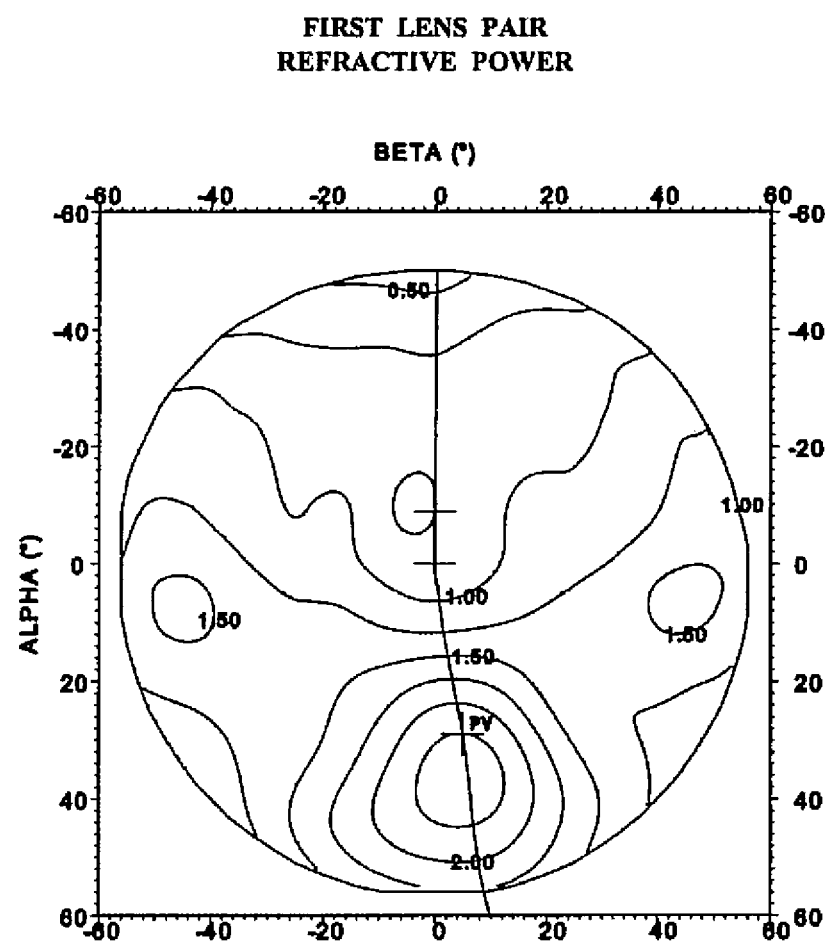
FIGS. 11 to 18 and 19a to 22a give optical characteristics for three examples of pair of progressive ophthalmic lenses according to the invention
Figure 12:
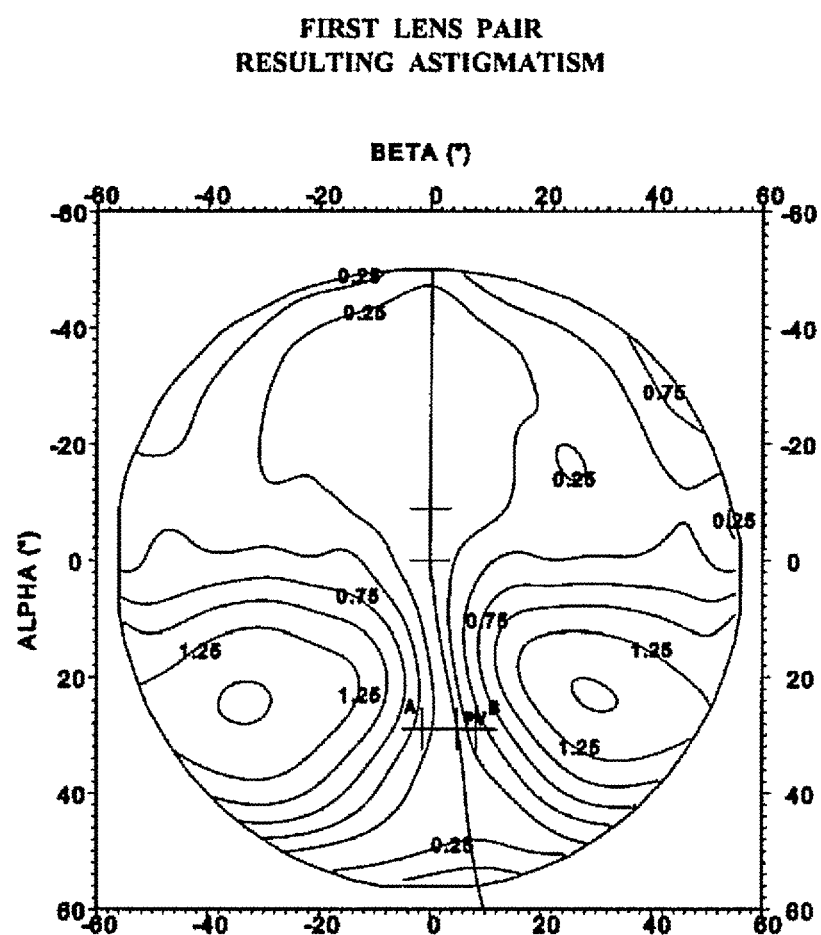

FIGS. 11 and 12 give optical characteristics (refractive power and resulting astigmatism) of the right-eye lens LENS1 of the pair.

Figure 13:
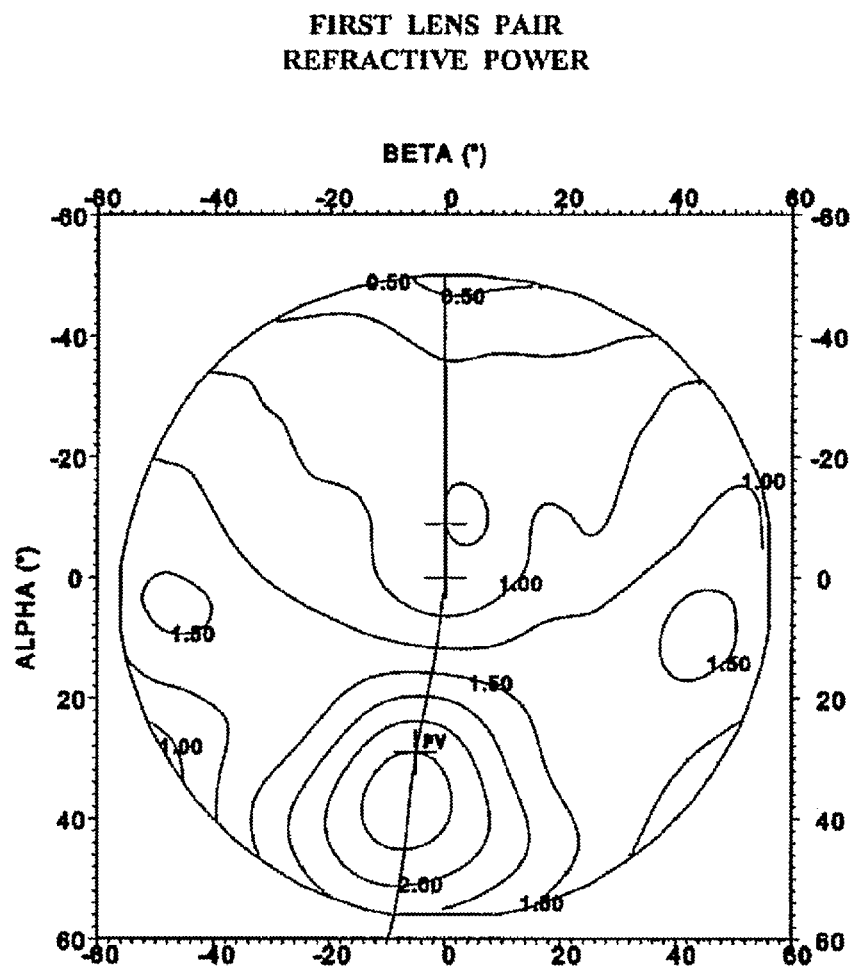
Figure 14:
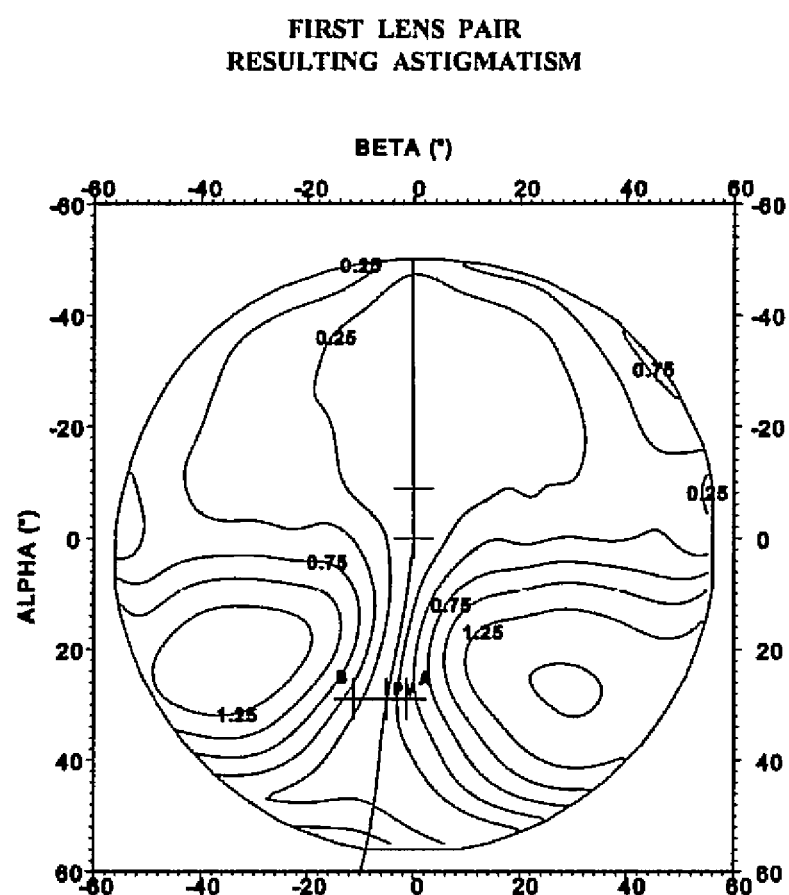

FIGS. 13 and 14 give optical characteristics (refractive power and resulting astigmatism) of the left-eye lens LENS2 of the pair.

On FIG. 11:

Point PV is located at $\alpha_{PVR}$=28.9° and $\beta_{PVR}$=4.9°

Point PV is located on the isometric curve corresponding to a power value:

P=0.75+100%*1.5=125 δ

On FIG. 12:

point PV is located at $\alpha_{PVR}$=28.9° and $\beta_{PVR}$=4.9° point A is located at $\alpha_{AR}$=$\alpha_{PVR}$=28.9° and $\beta_{AR}$=−1.4° point B is located at $\alpha_{BR}$=$\alpha_{PVR}$=28.9° and $\beta_{BR}$=8.4°

The isometric curve connecting points A and B correspond to a resulting astigmatism value:
Asr=1.5/4=0.375 δ
$T_{A\_RE}$=6.3° and $N_{A\_RE}$=3.5°
Then $R_{AR}$=0.28
On FIG. 13:
Point PV is located at $\alpha_{PVL}$=29.0° and $\beta_{PVL}$=−4.9°
Point PV is located on the isometric curve corresponding to a power value:
P=0.75+100%**1.5=2.25 δ
On FIG. 14:
point PV is located at $\alpha_{PVL}$=29.0° and $\beta_{PVL}$=−4.9°
point A is located at $\alpha_{AL}$=$\alpha_{PVL}$=29.0° and $\beta_{AL}$=−1.2°
point B is located at $\alpha_{BL}$=$\alpha_{PVL}$=29.0° and $\beta_{BL}$=−11.3°
The isometric curve connecting points A and B correspond to a resulting astigmatism value:
Asr=1.5/4=0.375 δ
$T_{A\_LE}$=3.7° and $N_{A\_LE}$=6.4°
Then $R_{AL}$=−0.27
This pair PAIR1 is intended for a right-handed person. The resulting astigmatism ratios are such that:

$$R_{AR} \geq 0 \text{ and } R_{AL} \leq 0$$

The ratios are further such that $R_{AR}$+$R_{AL}$ equals substantially to 0 taking into account the tolerance range ($R_{AR}$+$R_{AL}$=0.01)
This pair of lenses thus provides optimal comfort to a right-handed wearer by providing a dissymmetric design in useful zones when the wearer performs near vision tasks.

PAIR 2—FIGS. 15 to 18: Left-Handed Wearer, Optimisation for Resulting Astigmatism Example 2 corresponds to a pair PAIR2 of progressive ophthalmic lenses according to the invention intended for a left-handed wearer and which has been optimized in terms of resulting astigmatism.

In this case, the power prescription is +0.75 δ in far vision and the prescribed addition is 1.50 δ for both lenses of the pair. No astigmatism is prescribed for the wearer.

Figure 15:
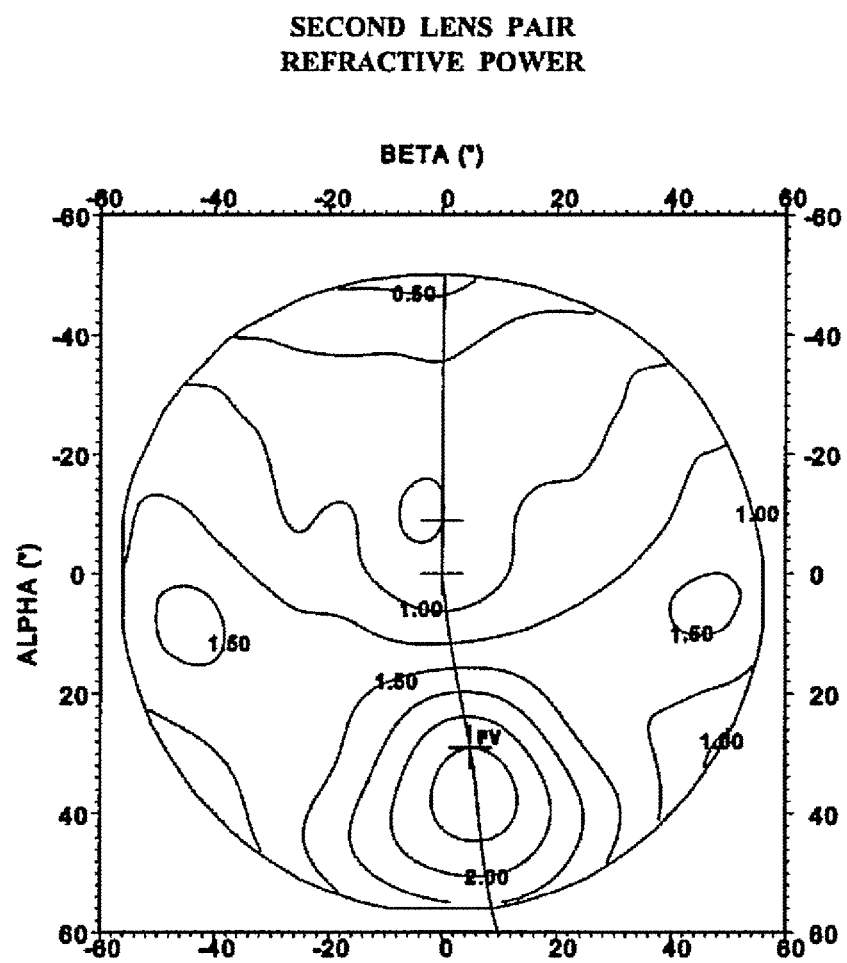
Figure 16:
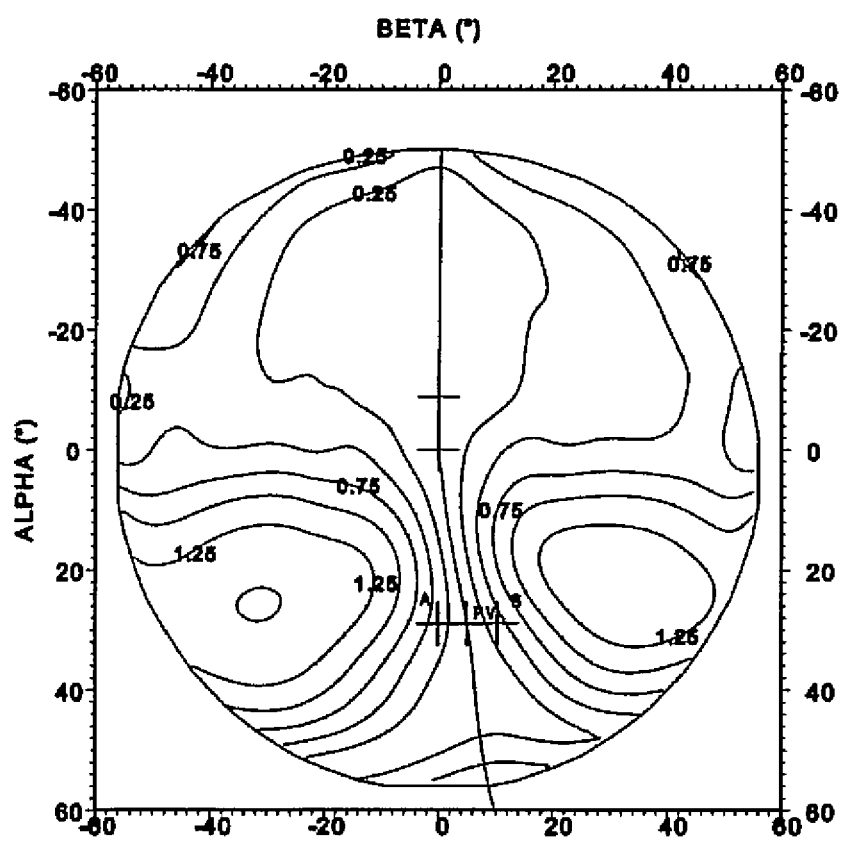

FIGS. 15 and 16 give optical characteristics (refractive power and module of resulting astigmatism) of the right-eye lens LENS3 of the pair.

Figure 17:
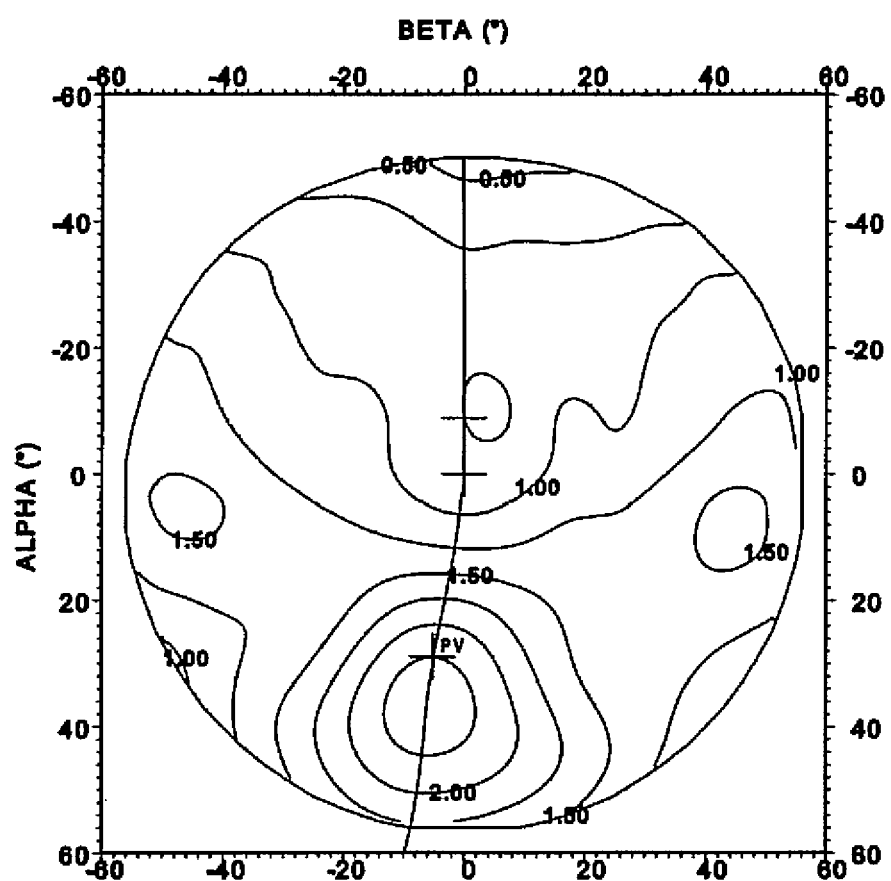
Figure 18:
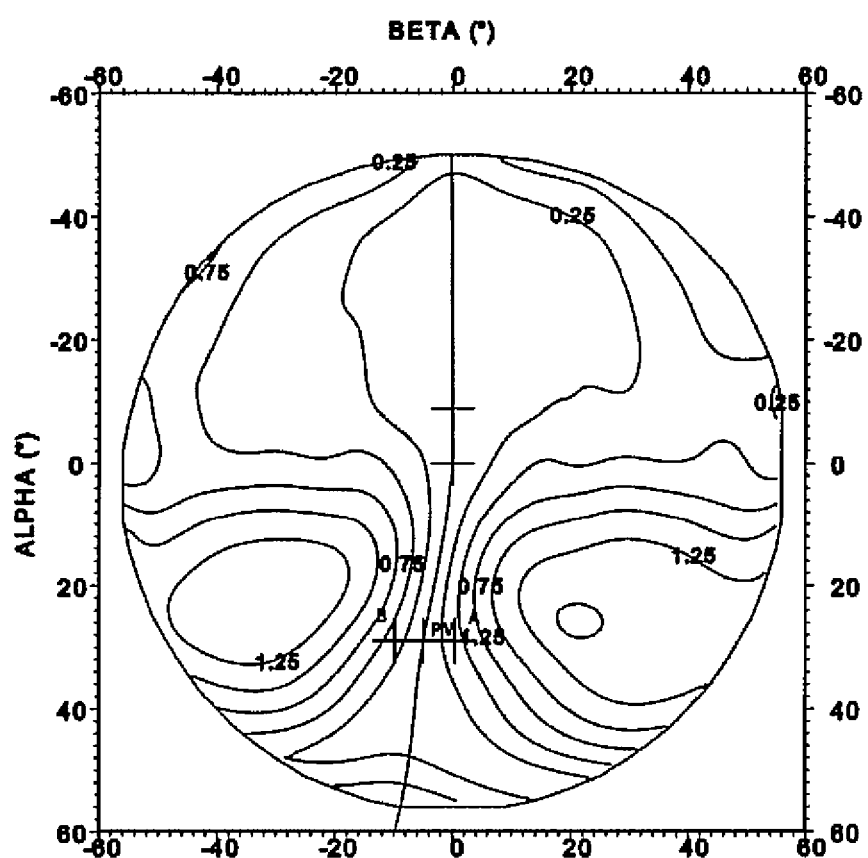

FIGS. 17 and 18 give optical characteristics (refractive power and module of resulting astigmatism) of the left-eye lens LENS4 of the pair.

On FIG. 15:
Point PV is located at $\alpha_{PVR}$=29.1° and $\beta_{PVR}$=5.0°
Point PV is located on the isometric curve corresponding to a power value:
P=0.75+100%*1.5=2.25 δ
On FIG. 16:
Point PV is located at $\alpha_{PVR}$=29.1° and $\beta_{PVR}$=5.0°
Point A is located at $\alpha_{AR}$=$\alpha_{PVR}$=29.1° and $\beta_{AR}$=−0.1°
Point B is located at $\alpha_{BR}$=$\alpha_{PVR}$=29.1° and $\beta_{BR}$=10.1°
The isometric curve connecting points A and B correspond to a resulting astigmatism value:
Asr=1.5/4=0.375 δ
$T_{A}$_RE=5.1° and $N_{A\_RE}$=5.1°
Then $R_{AR}$=0.00
On FIG. 17:
Point PV is located at $\alpha_{PVL}$=29.1° and $\beta_{PVL}$=−5.0°
Point PV is located on the isometric curve corresponding to a power value:
P=0.75+100%*1.5=2.25 δ
On FIG. 18:
point PV is located at $\alpha_{PVL}$=29.1° and $\beta_{PVL}$=−5.0°
point A is located at $\alpha_{AL}$=$\alpha_{PVL}$=29.1° and $\beta_{AL}$=0.1°
point B is located at $\alpha_{BL}$=$\alpha_{PVL}$=29.1° and $\beta_{BL}$=−10.1°

The isometric curve connecting points A and B correspond to a resulting astigmatism value:
Asr=1.5/4=0.375 δ
$T_{A\_LE}$=5.1° and $N_{A\_LE}$=5.1°
Then $R_{AL}$=0.00
This pair PAIR2 is intended for a left-handed person. The resulting astigmatism ratios are such that:

$$R_{AL}=R_{AR}=0$$

This pair of lenses thus provides optimal comfort to a left-handed wearer by providing a symmetric design in useful zones when the wearer performs near vision tasks.

PAIR3—FIGS. 19a to 22a: Left-Handed Wearer

Example 3 corresponds to a pair PAIR3 of progressive ophthalmic lenses according to the invention intended for a left-handed wearer and which has been optimized in terms of resulting astigmatism.

In this case, the power prescription is +0.75 δ in far vision and the prescribed addition is 1.50 δ for both lenses of the pair. No astigmatism is prescribed for the wearer.

Figure 19A:
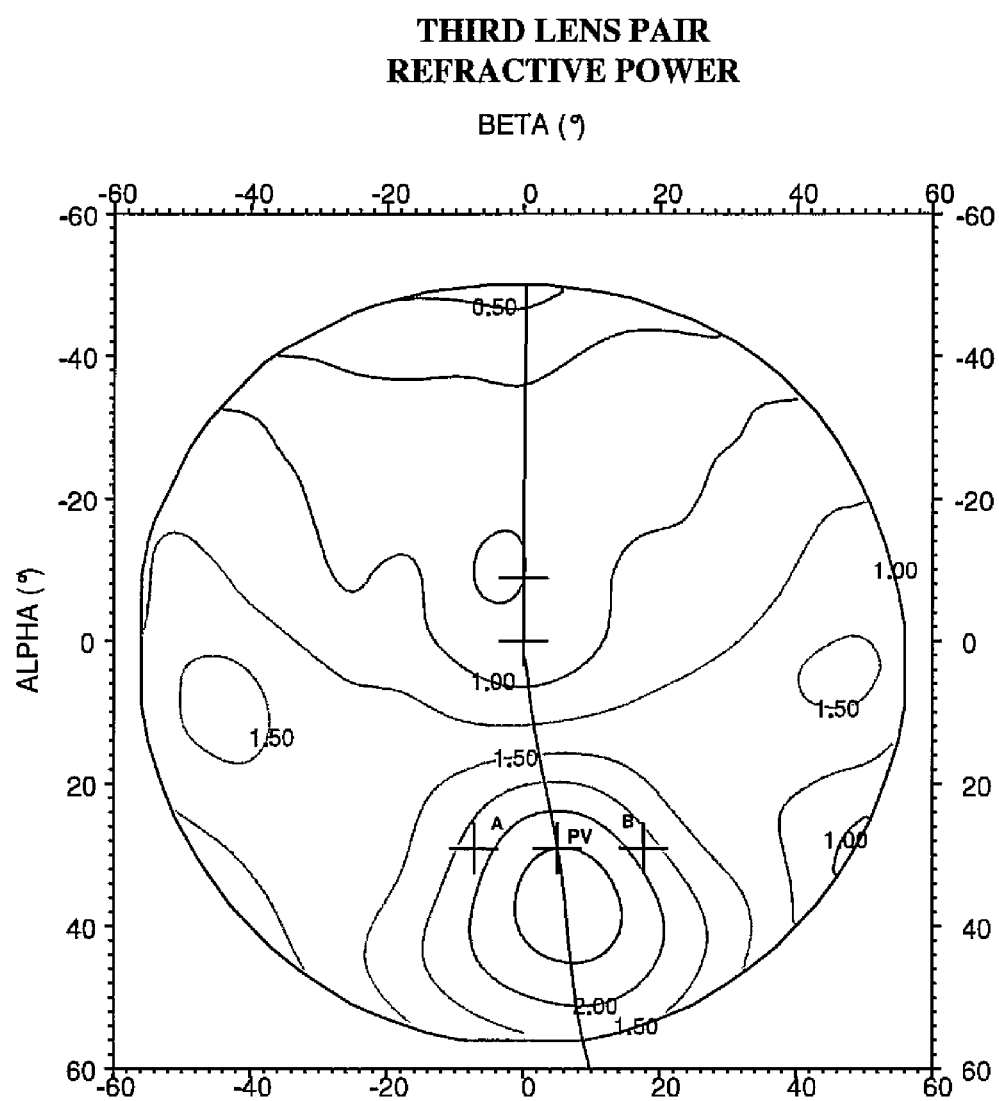
Figure 20A:
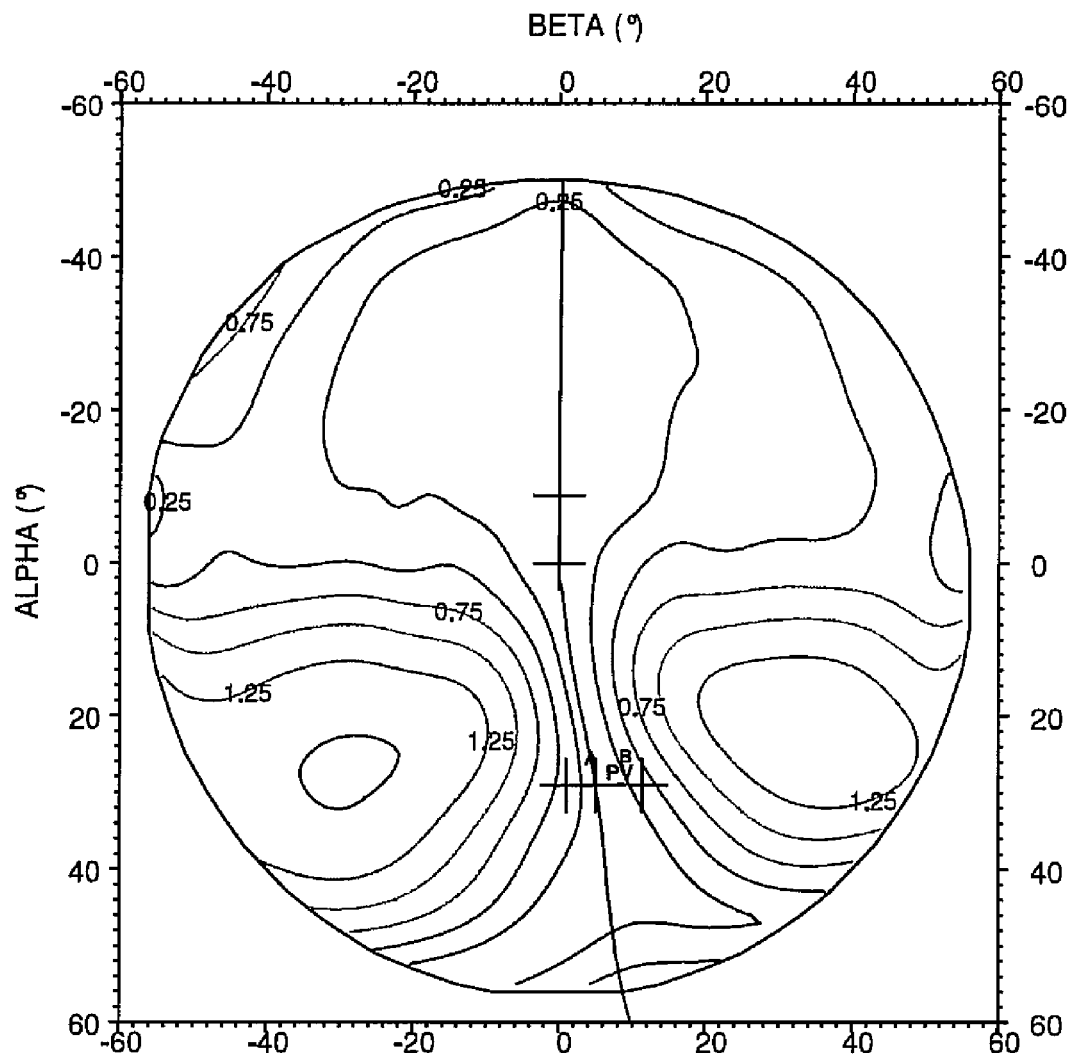

FIGS. 19a and 20a give optical characteristics (refractive power and resulting astigmatism) of the right-eye lens LENS1 of the pair PAIR3.

Figure 21A:
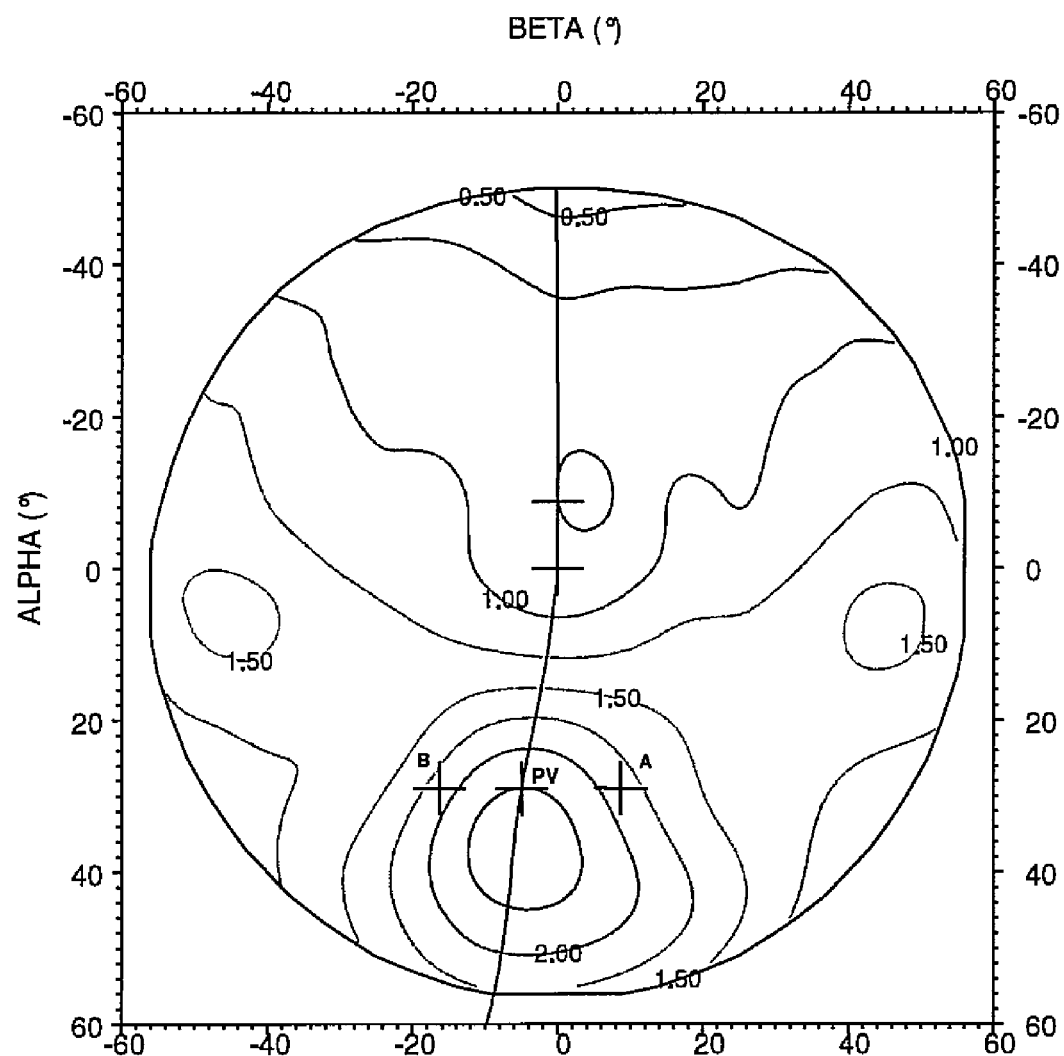
Figure 22:
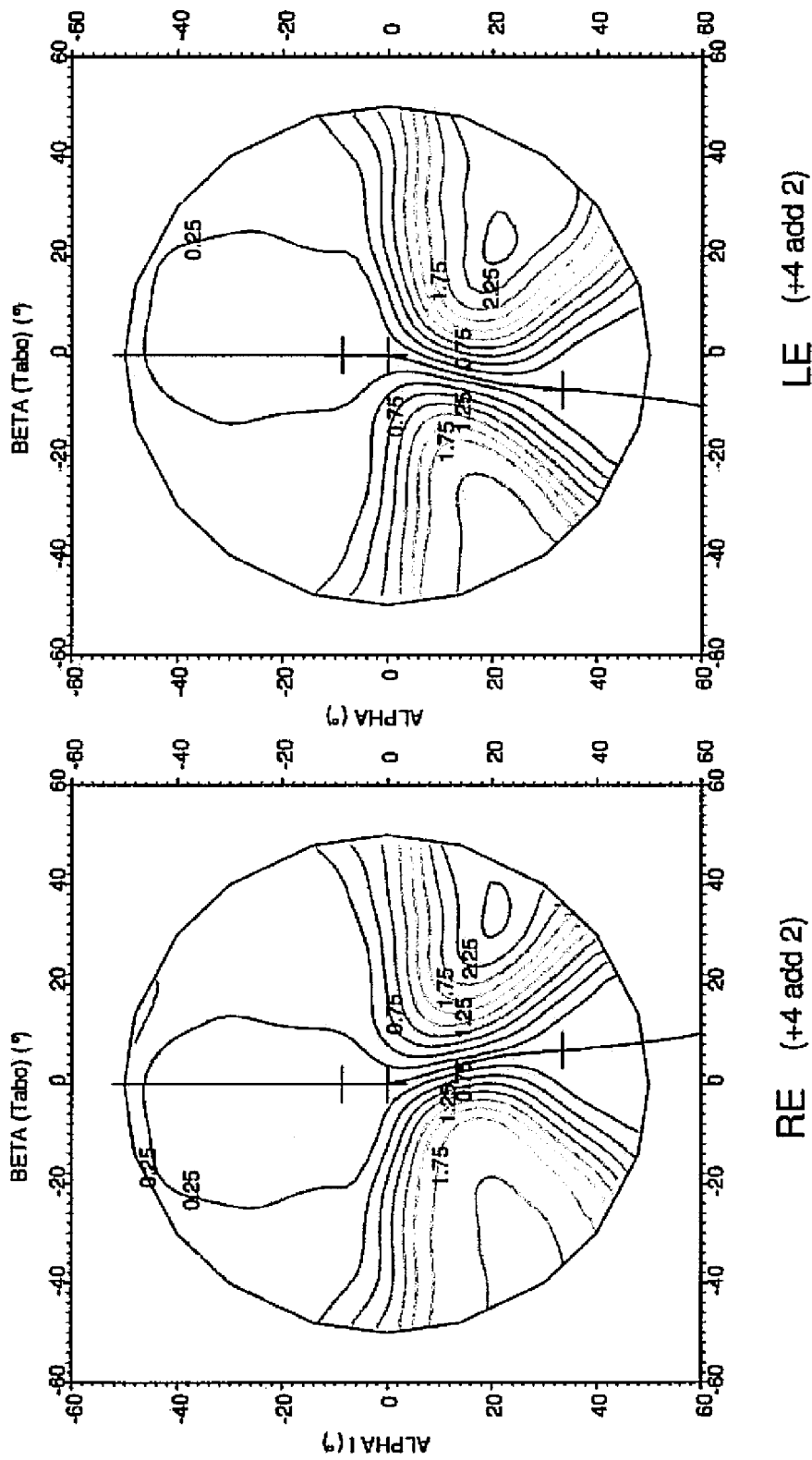
Figure 22A:
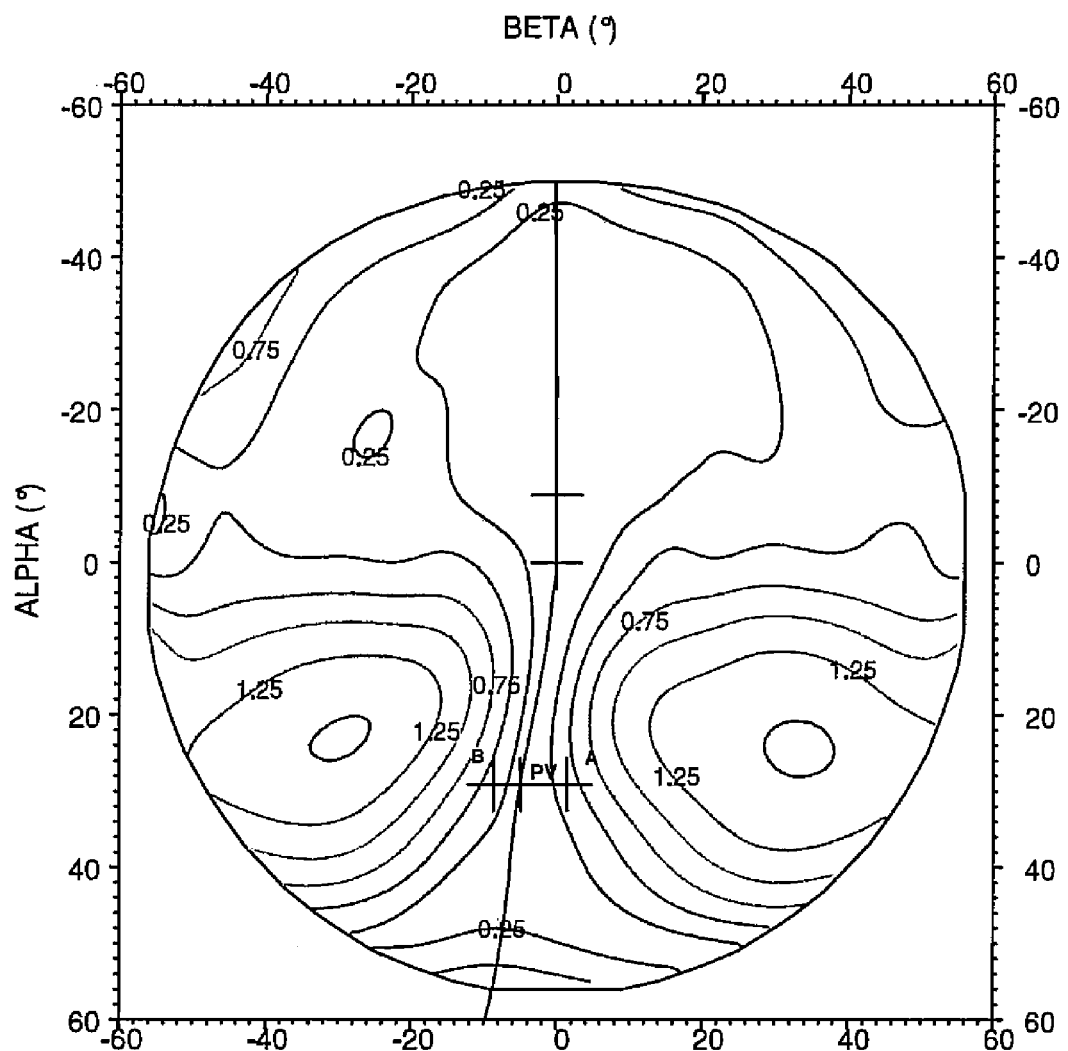

FIGS. 21a and 22a give optical characteristics (refractive power and resulting astigmatism) of the left-eye lens LENS2 of the pair PAIR3.

On FIG. 19a:
Point PV is located at $\alpha_{PVR}$=29.0° and $\beta_{PVR}$=5.0°
Point PV is located on the isometric curve corresponding to a power value:
P=0.75+100%*1.5=2.25 δ
On FIG. 20a:
point PV is located at $\alpha_{PVR}$=29.0° and $\beta_{PVR}$=5.0°
point A is located at $\alpha_{AR}$=$\alpha_{PVR}$=29.0° and $\beta_{AR}$=1.3°
point B is located at $\alpha_{BR}$=$\alpha_{PVR}$=29.0° and $\beta_{BR}$=11.4°
The isometric curve connecting points A and B correspond to a resulting astigmatism value:
Asr=1.5/4=0.375 δ
$T_{A\_RE}$=3.7° and $N_{A\_RE}$=6.4°
Then $R_{AR}$=−0.27
On FIG. 21a:
Point PV is located at $\alpha_{PVL}$=28.9° and $\beta_{PVL}$=−4.9°
Point PV is located on the isometric curve corresponding to a power value:
P=0.75+100%*1.5=2.25 δ
On FIG. 22a:
point PV is located at $\alpha_{PVL}$=28.9° and $\beta_{PVL}$=−4.9°
point A is located at $\alpha_{AL}$=$\alpha_{PVL}$=28.9° and $\beta_{AL}$=1.4°
point B is located at $\alpha_{BL}$=$\alpha_{PVL}$=28.9° and $\beta_{BL}$=−8.4°
The isometric curve connecting points A and B correspond to a resulting astigmatism value:
Asr=1.5/4 0.375 δ
$T_{A\_LE}$=6.3° and $N_{A\_LE}$=3.5°
Then $R_{AL}$=0.28
This pair PAIR3 is intended for a left-handed person. Indeed, the resulting astigmatism ratios are such that:

$$R_{AR} \leq 0 \text{ and } R_{AL} \geq 0$$

The ratios are further such that $R_{AR}$+$R_{AL}$ equals substantially to 0 taking into account the tolerance range ($R_{AR}$+$R_{AL}$=0.01)
The pair PAIR 3 thus provides optimal comfort to a left-handed wearer by providing a dissymmetric design in useful zones when the wearer performs near vision tasks.

Example 2

Progressive Lens Designs with Asymmetric Temporal/Nasal Half-Widths in Far Vision (Power and Astigmatism) as a Function of Wearer Handedness All parameters in example 2 relate to far vision, but are not annotated as such for simplification purposes. By analogy to example 1, progressive lens designs are provided with asymmetries with respect to half-widths for far vision, as a function of the wearer's handedness:

For a Right-Handed Wearer:

$$(T_{P\_LE}-N_{P\_LE})/(T_{P\_LE}+N_{P\_LE}) \leq 0 \text{ and } (T_{P\_RE}-N_{P\_RE})/(T_{P\_RE}+N_{P\_RE}) \geq 0$$

and/or $$(T_{A\_LE}-N_{A\_LE})/(T_{A\_LE}+N_{A\_LE}) \leq 0 \text{ and } (T_{A\_RE}-N_{A\_RE})/(T_{A\_RE}+N_{A\_RE}) \geq 0$$

For a Left-Handed Wearer:

$$(T_{P\_LE}-N_{P\_LE})/(T_{P\_LE}+N_{P\_LE}) \geq 0 \text{ and } (T_{P\_RE}-N_{P\_RE})/(T_{P\_RE}+N_{P\_RE}) \leq 0$$

and/or $$(T_{A\_LE}-N_{A\_LE})/(T_{A\_LE}+N_{A\_LE}) \geq 0 \text{ and } (T_{A\_RE}-N_{A\_RE})/(T_{A\_RE}+N_{A\_RE}) \leq 0$$

By Way of Illustration:

For a Right-Handed Wearer:

$$(T_{P\_LE}-N_{P\_LE})/(T_{P\_LE}+N_{P\_LE}) > -0 \text{ and } (T_{P\_RE}-N_{P\_RE})/(T_{P\_RE}+N_{P\_RE}) > 0.18$$

and/or $$(T_{A\_LE}-N_{A\_LE})/(T_{A\_LE}+N_{A\_LE}) < -0.25 \text{ and } (T_{A\_RE}-N_{A\_RE})/(T_{A\_RE}+N_{A\_RE}) > 0.25$$

For a Left-Handed Wearer:

$$(T_{P\_LE}-N_{P\_LE})/(T_{P\_LE}+N_{P\_LE}) \geq 0.18 \text{ and } (T_{P\_RE}-N_{P\_RE})/(T_{P\_RE}+N_{P\_RE}) < -0.18$$

and/or $$(T_{A\_LE}-N_{A\_LE})/(T_{A\_LE}+N_{A\_LE}) > 0.25 \text{ and } (T_{A\_RE}-N_{A\_RE})/(T_{A\_RE}+N_{A\_RE}) < -0.25$$

Advantageously according to the invention, the fields are more open towards the side of the hand used for far vision tasks, such as pointing towards an object situated at a distance.

Example 3

Progressive Lens Designs with Asymmetric Astigmatism Peaks (Maxima) as a Function of the Wearer's Handedness Nasal (resp. temporal) astigmatism peak value MaxAsrN (resp. MaxAsrT) is defined as the maximal value of resulting astigmatism in the nasal (resp. temporal) side of the lens. The softness of the design may be characterized by the astigmatism peak, can be customized as a function of the wearer's handedness. The design may be softened on the side of the writing hand (LE, left eye; RE: right eye):

For a Right-Handed Wearer:

$$\text{Max}AsrT\_LE - \text{Max}AsrN\_LE > 0 \text{ and } \text{Max}AsrT\_RE - \text{Max}AsrN\_RE < 0$$

For a Left-Handed Wearer:

$$\text{Max}AsrT\_LE - \text{Max}AsrN\_LE < 0 \text{ and } \text{Max}AsrT\_RE - \text{Max}AsrN\_RE > 0.$$

Optionally, the designs may further take into account the value A of prescribed addition. Advantageously, this results in less blur on the sides of the lens which are mainly used. Further, the head is more rotated towards the side of the hand, so that if the design is softer, then there is advantageously less visual distortion on this side.

For a Right-Handed Wearer:

$$\text{Max}AsrT\_LE - \text{Max}AsrN\_LE > \text{Max}(0.25*A - 0.25; 0.25)$$

and $$\text{Max}AsrT\_RE - \text{Max}AsrN\_RE < -\text{Max}(0.25*A - 0.25; 0.25);$$

For a Left-Handed Wearer:

$$\text{Max}AsrT\_LE - \text{Max}AsrN\_LE < -\text{Max}(0.25*A - 0.25; 0.25) \text{ and}$$

$$\text{Max}AsrT\_RE - \text{Max}AsrN\_RE > \text{Max}(0.25*A - 0.25; 0.25).$$

By Way of Example:

For a Right-Handed Wearer:

$$\text{Max}AsrT\_LE - \text{Max}AsrN\_LE > 0.50 \text{ and}$$

$$\text{Max}AsrT\_RE - \text{Max}AsrN\_RE < -0.50;$$

For a Left-Handed Wearer:

$$\text{Max}AsrT\_LE - \text{Max}AsrN\_LE < -0.5 \text{ and}$$

$$\text{Max}AsrT\_RE - \text{Max}AsrN\_RE > 0.50.$$

Example 4

Handedness Determination

The following illustrates determination of handedness following different methods.

Single Question

A wearer is asked which hand s/he uses to perform hand writing.

If the answer is "right", then the handedness is determined as "right-handed" and a handedness value of +100 can be allocated.

If the answer is "left", then the handedness is determined as "left-handed" and a handedness value of −100 can be allocated.

Edinburgh Inventory

The protocol is as described by Oldfield, R. C. "*The assessment and analysis of handedness: the Edinburgh inventory.*" Neuropsychologia 9(1):97-113 (1971).

In accordance with the method, the subject is asked a series of handedness related questions and is to answer quantitatively. The outcome is a laterality quotient LQ, which ranges from −100 (very left-handed) to +100 (very right-handed).

Accordingly, a handedness value H can be defined as the LQ value obtained following this method.

Modified Edinburgh Inventories

It is possible to follow the same principle of quotient computing as per Oldfield, R. C. "*The assessment and analysis of handedness: the Edinburgh inventory.*" Neuropsychologia. 9(1):97-113 (1971), but with modifications regarding the nature of the questions. In particular, it is possible to define H=LQ values for distant-vision (respectively intermediate vision, respectively near-vision), by listing questions related to tasks using distant-vision (respectively intermediate vision, respectively near-vision). For example, near-vision tasks that may be used to define near-vision LQ may include one or more of:
- write on a piece of paper,
- dial a number on a desk phone,
- dial a number on a portable/cell phone,
- navigate on a touch screen (vending machine, e-tablet, smart phone),
- stir contents of a pot or a pan,
- shave or apply makeup.

Example of far-vision task: point towards a plane in the sky, or any other distant point; bow shooting.

Example of intermediate-vision tasks: start up the dishwasher or the oven; reach for an item placed on a high shelf.

Computation Principle in Modified Edinburgh Inventories

The subject is provided with the following questionnaire:

| Which hand do you use to perform | Left | Right |
|---|---|---|
| Task 1 | | |
| Task 2 | | |
| Task 3 (etc) | | |

The subject is asked to please indicate his/her preferences in the use of hands in each task by putting "+" in the appropriate column. If the preference is so strong that one would never try to use the other hand unless absolutely forced, one puts "++". If in any case the subject is indifferent, put "+" in both column.

$H=LQ$ is defined as [(number of "+" in right column)−(number of "+" in left column)/number of "+"]*100.

Example of Computation for Modified Edinburgh Inventories in Different Vision Zones

| Vision zone | Which hand do you use to perform | Left | Right |
|---|---|---|---|
| distant | Point towards a plane in the sky | + | |

LQ (distant vision) = [(0 − 1)/1] * 100 = −100

| Vision zone | Which hand do you use to perform | Left | Right |
|---|---|---|---|
| intermediate | Reach for an item placed on a high shelf | + | + |
| | Start-up dishwasher or oven | | ++ |

LQ (intermediate vision) = [(3 − 1)/4] * 100 = +50

| Vision zone | Which hand do you use to perform | Left | Right |
|---|---|---|---|
| near | Hand write | | ++ |
| | Use touch screen of smart phone | | + |
| | Stir content of pot | | ++ |

LQ (near vision) = [(5 − 0)/5] * 100 = +100

Advantageously, the use of the various laterality quotients as a handedness factor according to the invention allows to define individually the level of asymmetry for each of the near-vision, far-vision and intermediate-vision zones, on each of the lenses.

Example 5

Pair of Lenses with Asymmetric Insets as a Function of Handedness

The inset for each lens (inset_RE_initial and inset_LE_initial) is first determined without taking into account wearer handedness. The values for inset_RE_initial and inset_LE_initial are determined as a function of the prescription data, and where applicable, other parameters, such as in accordance with WO2010034727.

Inset values that take into account handedness may then be determined as follows: for a right-handed wearer:
inset RE=inset_RE_initial−Delta_inset,
inset LE=inset_LE_initial+Delta_inset
while for a left-handed wearer:
inset RE=inset_RE_initial+Delta_inset
inset LE=inset_LE_initial−Delta_inset,
wherein:
SPD=Distance between the sagittal plan and the gazed point in near vision=30 mm
CRE_L=distance between the center of rotation of the eye and the lens=25.5 mm
RD=reading distance=400=
Delta_inset CRE_L/DL*DPS=1.9 mm.

Example 6

Progressive Lenses of the Invention

FIG. 22 shows resulting astigmatism maps of progressive lenses of the invention.

The lenses are designed for near-vision for a right-handed wearer having identical prescription data for the two eyes (+4 Add 2). The maps are obtained using ray-tracing as described above, and show values for resulting astigmatism as a function of the gaze direction, wherein the lenses are positioned in average wearing conditions.

On each lens, the right-hand side of the wearer is favoured with respect to maximal value of resulting astigmatism (Max Asr):

On the right-eye lens, Max Asr (temporal)<Max Asr (nasal), whereas on the left-eye lens, Max Asr (nasal)<Max Asr (temporal).

The invention claimed is:

1. An ophthalmic lens adapted to be worn by a wearer, wherein the lens is designed as a function of the wearer's handedness,
wherein said ophthalmic lens has respective nasal and temporal half-widths of a near-vision zone with respect to a proximate-vision gaze direction, of an intermediate-vision zone with respect to a meridian line, and of a distant-vision zone with respect to a distant-vision gaze direction,
wherein said lens is asymmetric in that:
the nasal/temporal half-widths of one or more of the following:
the near-vision zone with respect to a proximate-vision gaze direction,
the intermediate-vision zone with respect to the meridian line,
the distant-vision zone with respect to a distant-vision gaze direction,
are asymmetric as a function of the wearers handedness, and/or at least one optical parameter between the nasal part and the temporal part of the lens is asymmetric as a function of the wearers handedness, wherein said optical parameter is selected from any one of central vision optical criteria selected from the group comprising: power in central vision, astigmatism in central vision, high order aberration in central vision, acuity in central vision, prismatic deviation in central vision, ocular deviation, object visual field in central vision, image visual field in central vision, magnification in central vision;

any one of peripheral vision optical criteria selected from the group comprising: power in peripheral vision, astigmatism in peripheral vision, high order aberration in peripheral vision, pupil field ray deviation, object visual field in peripheral vision, image visual field in peripheral vision, prismatic deviation in peripheral vision, magnification in peripheral vision;

any one of global optical criteria selected from the group comprising: magnification of the eye, temple shift, any one of surface criteria selected from the group comprising: front or back mean curvature, front or back minimum curvature, front or back maximum curvature, front or back cylinder axis, front or back cylinder, front or back mean sphere, front or back maximum sphere, front or back minimum sphere, and/or the maximal value (respectively, minimal value, peak-to-valley value, maximal gradient value, minimal gradient value, maximal slope value, minimal slope value, average value) of any one of the preceding criteria, in one or more useful zones of the lens, including zones for near-vision, distant-vision, and intermediate-vision, wherein the lens is asymmetric in that at least one optical parameter ($\pi$) between the nasal (N) part and the temporal (T) part of the lens is asymmetric as a function of the wearer's handedness, and wherein:

$$ABS[(\pi_T-\pi_N)/avg(\pi_T;\pi_N)]>0.15$$

wherein:
ABS is absolute value,
avg denotes the average value.

2. A pair of ophthalmic lenses adapted to be worn by a wearer, comprising:

a first ophthalmic lens according to claim 1, wherein said first lens is configured for the right eye (RE) of the wearer, and a second ophthalmic lens according to claim 1, wherein said second lens is configured for the left eye (LE) of the wearer, wherein $(\pi_{T\_RE}-\pi_{N\_RE})/avg(\pi_{T\_RE}, \pi_{N\_RE})$ and $(\pi_{T\_LE}-\pi_{N\_LE})/avg(\pi_{T\_LE}, \pi_{N\_LE})$ are of opposite signs.

3. A range of ophthalmic lenses according to claim 1, wherein said range comprises:

a set of ophthalmic lenses configured for a right-handed wearer, and a set of ophthalmic lenses configured for a left-handed wearer.

4. The ophthalmic lens of claim 1, which is a spectacle progressive ophthalmic lens.

5. The ophthalmic lens according to claim 1, wherein the wearer's handedness is/was previously determined by:

the answer of the wearer when asked whether (s)he is left-handed or right-handed for a given activity, the laterality quotient as determined using the Edinburgh Inventory or the answer of the wearer when asked one or more handedness questions, or physical testing and/or measurements.

6. The ophthalmic lens of claim 5, wherein said given activity is writing.

7. The ophthalmic lens of claim 5, wherein the wearers handedness is/was previously determined by the answer of the wearer when asked whether (s)he is left-handed or right-handed for writing in combination with the answer of the wearer when asked whether (s)he uses a posture of hooked writing or regular writing.

8. The ophthalmic lens of claim 5, wherein said one or more handedness questions is selected from the Edinburgh Inventory.

9. The ophthalmic lens of claim 5, wherein said physical testing and/or measurements is head/eye tracking.

10. A pair of ophthalmic lenses intended to be worn by a wearer having a right eye (RE) and a left eye (LE), wherein said pair of lenses is asymmetrical in that for at least one optical parameter ($\pi$) defined on the lens intended for the right eye ($\pi_{RE}$) and defined on the lens for the left eye ($\pi_{LE}$), the amount $\pi_{RE}-\pi_{LE}$ is a function of the wearer's handedness, wherein said optical parameter is selected from any one of central vision optical criteria selected from the group comprising: power in central vision, astigmatism in central vision, high order aberration in central vision, acuity in central vision, prismatic deviation in central vision, ocular deviation, object visual field in central vision, image visual field in central vision, magnification in central vision;

any one of peripheral vision optical criteria selected from the group comprising: power in peripheral vision, astigmatism in peripheral vision, high order aberration in peripheral vision, pupil field ray deviation, object visual field in peripheral vision, image visual field in peripheral vision, prismatic deviation in peripheral vision, magnification in peripheral vision;

any one of global optical criteria selected from the group comprising: magnification of the eye, temple shift, any one of surface criteria selected from the group comprising: front or back mean curvature, front or back minimum curvature, front or back maximum curvature, front or back cylinder axis, front or back cylinder, front or back mean sphere, front or back maximum sphere, front or back minimum sphere, and/or the maximal value (respectively, minimal value, peak-to-valley value, maximal gradient value, minimal gradient value, maximal slope value, minimal slope value, average value) of any one of the preceding criteria, in one or more useful zones of the lens for near-vision, distant-vision, and intermediate-vision, and wherein:

$$(\pi_{RE}-\pi_{LE})/avg(\pi_{RE};\pi_{LE})=aH+b;$$

wherein
ABS is absolute value,
avg denotes the average value,
a and b are constants,
H is a handedness parameter.

11. The pair of ophthalmic lenses of claim 10, which is a pair of spectacle progressive ophthalmic lenses.

12. The pair of ophthalmic lenses of claim 11, wherein $ABS[(\pi_{RE}-\pi_{LE})/avg(\pi_{RE};\pi_{LE})]>0.15.$ 13. The pair of ophthalmic lenses of claim 10, wherein $ABS[(\pi_{RE}-\pi_{LE})/avg(\pi_{RE};\pi_{LE})]>0.15.$

* * * * *